United States Patent
Mano

(10) Patent No.: US 12,470,676 B2
(45) Date of Patent: Nov. 11, 2025

(54) PROJECTOR, METHOD FOR CONTROLLING PROJECTOR, AND INFORMATION PROCESSING APPARATUS

(71) Applicant: SEIKO EPSON CORPORATION, Tokyo (JP)

(72) Inventor: Tetsuo Mano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 488 days.

(21) Appl. No.: 17/968,661

(22) Filed: Oct. 18, 2022

(65) Prior Publication Data
US 2023/0122183 A1    Apr. 20, 2023

(30) Foreign Application Priority Data
Oct. 19, 2021    (JP) .................................. 2021-170942

(51) Int. Cl.
*H04N 9/31*    (2006.01)

(52) U.S. Cl.
CPC ......... *H04N 9/3182* (2013.01); *H04N 9/3194* (2013.01)

(58) Field of Classification Search
CPC .................. H04N 9/31–3197; G03B 21/00–64
See application file for complete search history.

(56) References Cited

U.S. PATENT DOCUMENTS

| | | | |
|---|---|---|---|
| 2017/0208300 A1* | 7/2017 | Toyooka | H04N 9/3167 |
| 2018/0146176 A1* | 5/2018 | Orlick | H04N 9/3182 |
| 2020/0072672 A1 | 3/2020 | Oike | |
| 2020/0077058 A1 | 3/2020 | Matsumoto | |

FOREIGN PATENT DOCUMENTS

| | | |
|---|---|---|
| JP | 2002-333671 A | 11/2002 |
| JP | 2004-226631 A | 8/2004 |
| JP | 2009-038182 A | 2/2009 |
| JP | 2010-187211 A | 8/2010 |
| JP | 2011-76029 A | 4/2011 |
| JP | 2017-212516 A | 11/2017 |
| JP | 2020-034741 A | 3/2020 |
| JP | 2020-036198 A | 3/2020 |

OTHER PUBLICATIONS

SHARP Corporation, "Laser Diodes Catalog," Mar. 2022, [URL: https://global.sharp/products/device/catalog/e-catalog/laser/index.html].
"No. 14 Elements of Visual Characteristics for Color (part 1)," [URL: https://www.ccs-inc.co.jp/guide/column/light_color/vol14.html].
"RGB to XYZ conversion—Glossary," [URL: http://vig.is.env.kitakyu-u.ac.jp/etc/rgb2xyz.html].

* cited by examiner

*Primary Examiner* — Christopher A Lamb, II
(74) *Attorney, Agent, or Firm* — Oliff PLC

(57) ABSTRACT

A method for controlling a projector including a light source, the method including identifying the state of the light source, generating a correction parameter based on the state of the light source, and correcting an image projected from the projector based on the correction parameter.

14 Claims, 14 Drawing Sheets

PROJECTOR, METHOD FOR CONTROLLING PROJECTOR, AND INFORMATION PROCESSING APPARATUS

The present application is based on, and claims priority from JP Application Serial Number 2021-170942, filed Oct. 19, 2021, the disclosure of which is hereby incorporated by reference herein in its entirety.

BACKGROUND

1. Technical Field

The present disclosure relates to a projector, a method for controlling the projector, and an information processing apparatus.

2. Related Art

Technologies have been developed to measure the colors of an image projected from a projector and adjust the colors of the projected image based on the result of the measurement. For example, JP-A-2020-36198 discloses a projector that measures R, G, B values of a projection image, which are tristimulus values expressed in the RGB color system, and a Z value out of X, Y, and Z values of the projection image, which are tristimulus values expressed in the XYZ color system, and corrects the projection image by using correction parameters generated based on the measured R, G, B, and Z values.

The projector according to JP-A-2020-36198 requires use of a special optical filter called a Z filter when actually measuring the Z value, resulting in a problem of complication of the configuration of the projector.

SUMMARY

A method for controlling a projector according to an aspect of the present disclosure is a method for controlling a projector including a light source, the method including identifying the state of the light source, generating a correction parameter based on the state of the light source, and correcting an image projected from the projector based on the correction parameter.

A projector according to another aspect of the present disclosure includes a light source, a light source state identification section that identifies the state of the light source, a parameter generation section that generates a correction parameter based on the state of the light source, an image processing section that corrects a projection image based on the correction parameter, and a projection section that projects the image corrected based on the correction parameter.

An information processing apparatus according to another aspect of the present disclosure an information processing apparatus that corrects an image projected from a projector including a light source, the apparatus including a light source state identification section that identifies the state of the light source, a parameter generation section that generates a correction parameter based on the state of the light source, and an image processing section that corrects the image based on the correction parameter.

A non-transitory computer-readable storage medium according to another aspect of the present disclosure includes a program that causes a processor to function as a light source state identification section that identifies the state of a light source provided in a projector, a parameter generation section that generates a correction parameter based on the state of the light source, and an image processing section that corrects an image projected from the projector based on the correction parameter.

DESCRIPTION OF EXEMPLARY EMBODIMENTS

Figure 1:
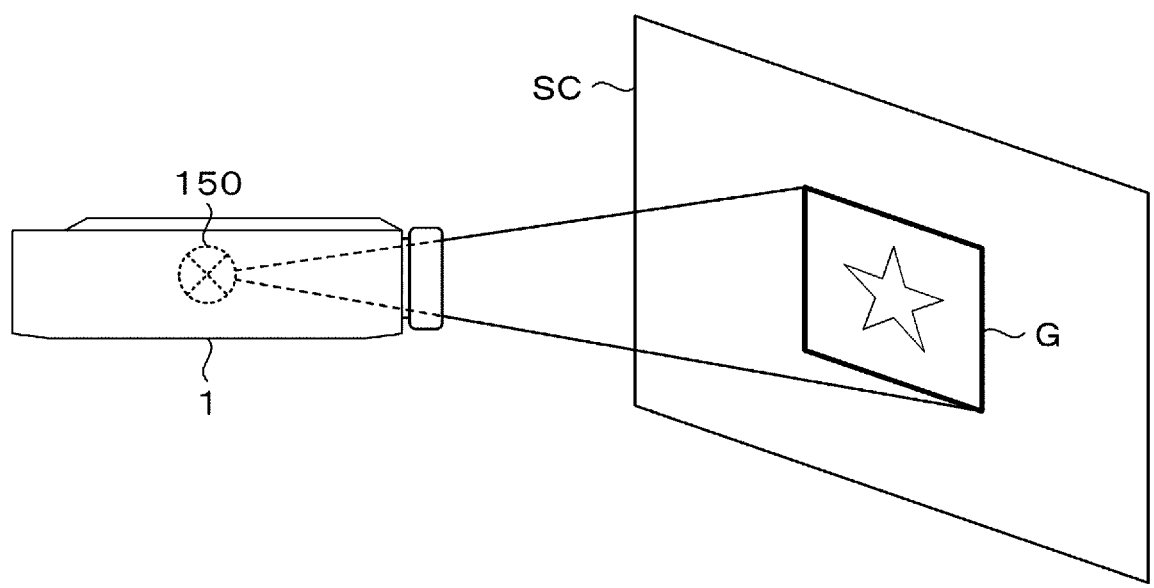
FIG. 1 is a diagrammatic view for describing an overview of a projector according to a first embodiment.

Preferable embodiments according to the present disclosure will be described below with reference to the accompanying drawings. In the drawings, the dimensions and scale of each portion differ from actual values in some cases, and some of the portions are diagrammatically drawn for ease of understanding. The scope of the present disclosure is not limited to the embodiments unless particular restrictions on the present disclosure are made in the following description. In the present specification and the claims, when a numerical range is expressed by using "Φ to Ψ" (Φ and Ψ are both numerical values), the range includes the numerical values of the upper limit (Ψ) and the lower limit (Φ). The upper limit (Ψ) and the lower limit (Φ) are expressed in the same unit.

1. First Embodiment

In a first embodiment, a method for controlling a projector, the projector, an information processing apparatus, and a program according to the present disclosure will be described with reference to a projector that corrects a projection image based on the state of a light source.

1.1. Overview of Projector

FIG. 1 is a diagrammatic view for describing an overview of a projector 1 according to the first embodiment. The projector 1 according to the present embodiment projects image light that displays a projection image G on a screen SC.

In general, in a projector including a light source, the wavelength of the light emitted from the light source may change in accordance with the temperature of the light source, the value of the current supplied to the light source, the degree of aging of the light source, and other factors. That is, the state of a displayed projection image may change from the ideal state in accordance with the state of the light source provided in the projector. The projector 1 according to the present embodiment can achieve an ideal state of the displayed projection image G or a state close to the ideal state by identifying the state of a light source unit 150 and correcting the projection image G based on the state of the light source unit 150.

1.2. Configuration and Function of Projector

The configuration and function of the projector 1 according to the first embodiment will be described below with reference to FIGS. 2 to 4.

Figure 2:
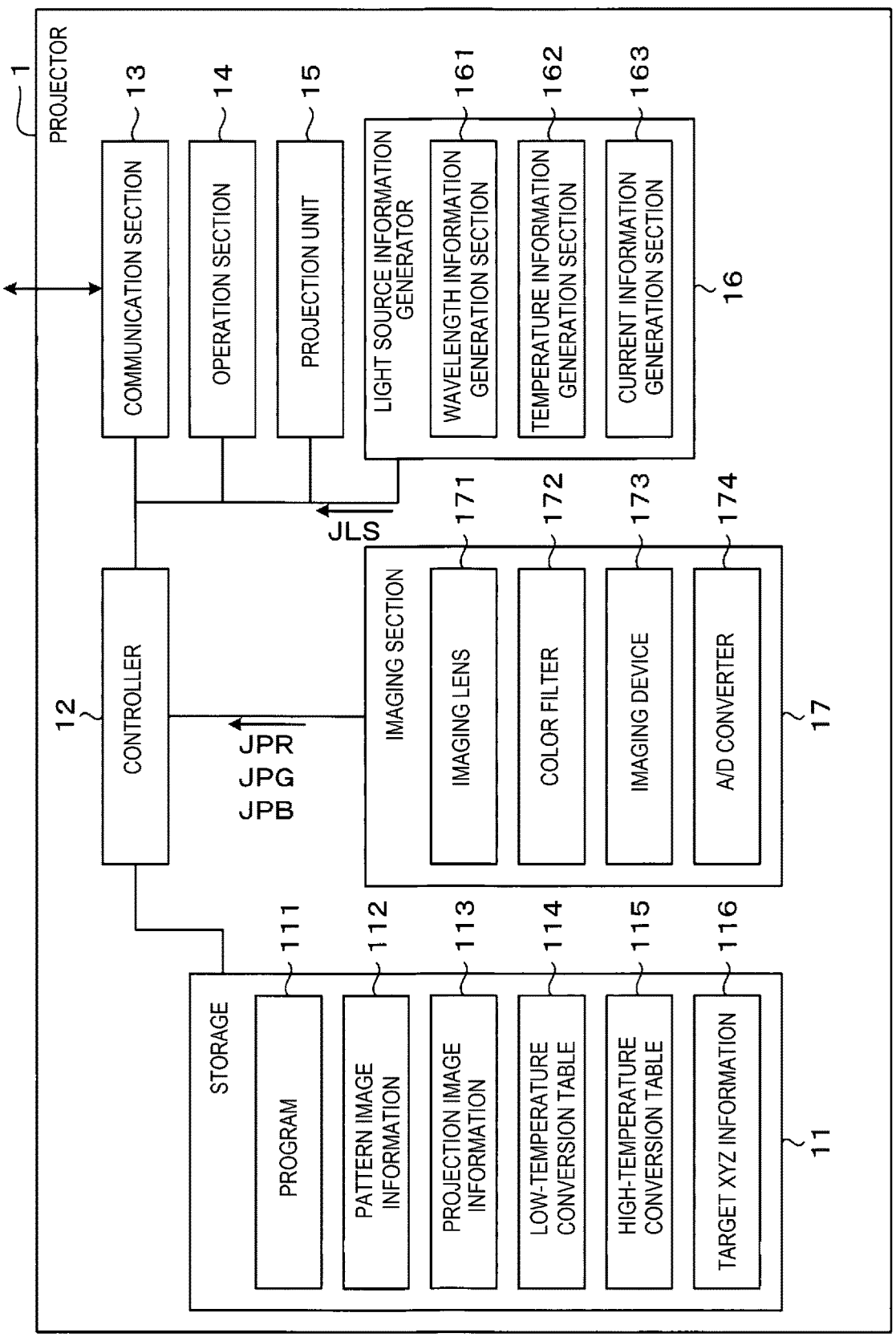
FIG. 2 is a block diagram showing the configuration of the projector according to the first embodiment.

FIG. 2 is a block diagram showing the configuration of the projector 1 according to the first embodiment. The projector 1 includes a storage 11, which stores a variety of pieces of information, a controller 12, which controls the action of the projector 1, a communication section 13, which performs communication with an external storage apparatus, an external server, or any other apparatus, an operation section 14, which accepts input operation from a user of the projector 1, a projection unit 15, which projects the projection image G and a pattern image GP, a light source information generator 16, which generates light source information JLS based on the state of the light source unit 150 provided in the projection unit 15, and an imaging section 17, which captures an image of the pattern image GP. The pattern image GP will be described later in detail.

Figure 3:
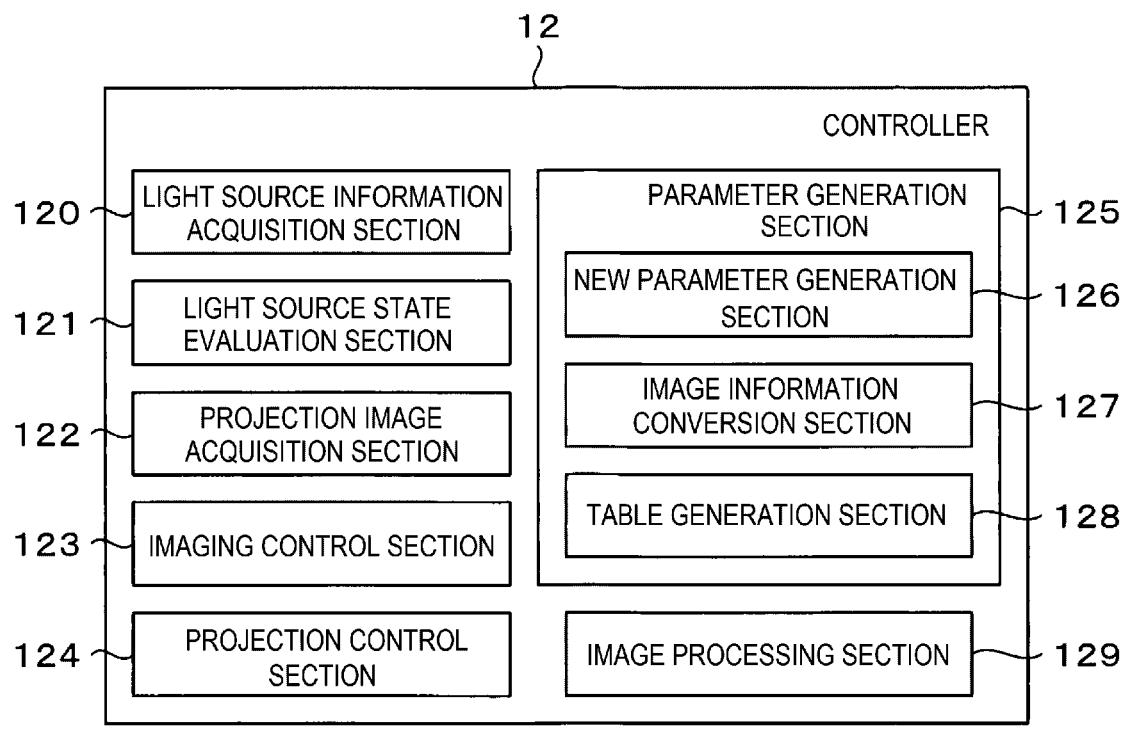
FIG. 3 is a block diagram showing the functional configuration of a controller according to the first embodiment.

FIG. 3 is a block diagram showing the functional configuration of the controller 12 according to the first embodiment. The controller 12 has the functions of a light source information acquisition section 120, a light source state evaluation section 121, a projection image acquisition section 122, an imaging control section 123, a projection control section 124, a parameter generation section 125, and an image processing section 129. The parameter generation section 125 also has the functions of a new parameter generation section 126, an image information conversion section 127, and a table generation section 128.

Figure 4:
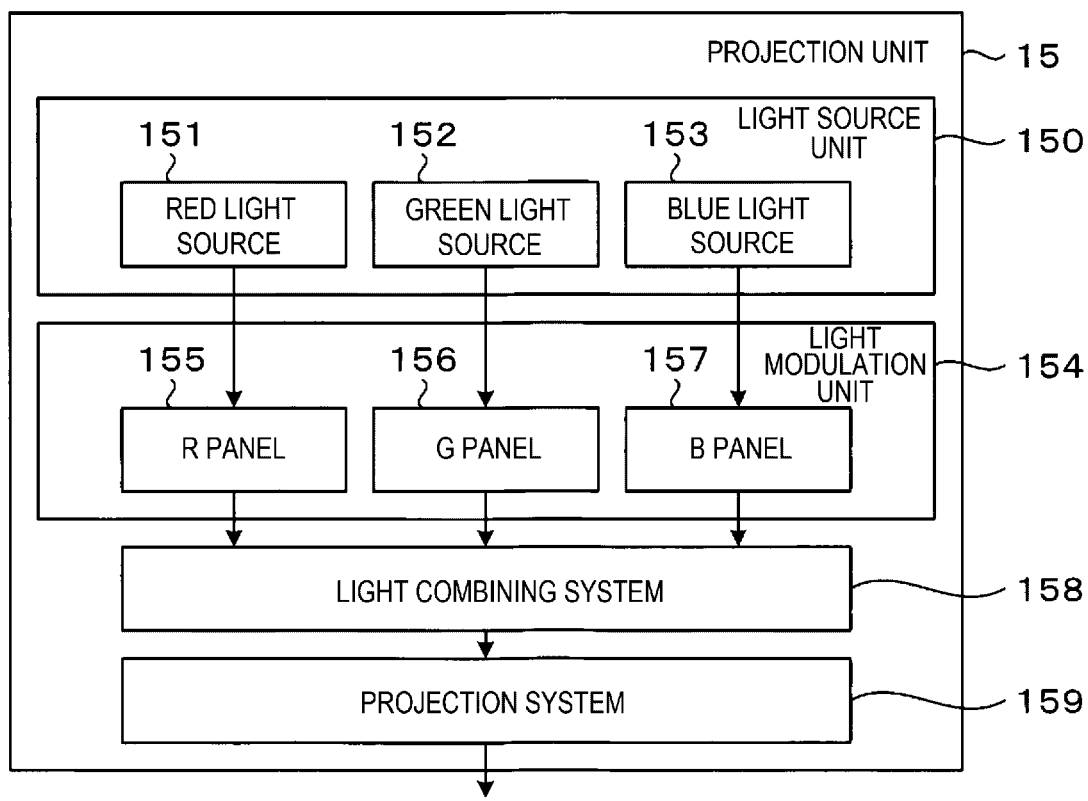
FIG. 4 is a block diagram showing the configuration of a projection unit according to the first embodiment.

FIG. 4 is a block diagram showing the configuration of the projection unit 15 according to the first embodiment. The projection unit 15 includes the light source unit 150, a light modulation unit 154, a light combining system 158, and a projection system 159. The light source unit 150 includes a red light source 151, a green light source 152, and a blue light source 153. The light modulation unit 154 includes an R panel 155, a G panel 156, and a B panel 157.

The storage 11 includes, for example, a volatile memory, such as a RAM, and a nonvolatile memory, such as a ROM. The RAM is an abbreviation for a random access memory. The ROM is an abbreviation for a read only memory. The nonvolatile memory provided in the storage 11 stores a program 111, which defines the action of the projector 1, pattern image information 112 based on the result of capture of an image of the pattern image GP, and projection image information 113, which is the source of the projection image G. The non-volatile memory provided in the storage 11 stores a low-temperature conversion table 114, a high-temperature conversion table 115, target XYZ information 116, and other pieces of information, which are used to generate correction parameters PmC for correction of the projection image G. The volatile memory provided in the storage 11 is also used by the controller 12 as a work area when the controller 12 executes the program 111. Part or entirety of the storage 11 may be provided in the external storage apparatus, the external server, or any other apparatus. Part or entirety of the variety of pieces of information stored in the storage 11 may be stored in the storage 11 in advance, or may be acquired from the external storage apparatus, the external server, or any other apparatus via the communication section 13.

The controller 12 includes one or more CPUs. It is, however, noted that the controller 12 may include a programmable logic device, such as an FPGA, in place of or in addition to the CPU or CPUs. The CPU is an abbreviation for a central processing unit, and FPGA is an abbreviation for a field-programmable gate array.

When the CPU or any other device provided in the controller 12 executes the program 111, the controller 12 operates in accordance with the program 111 to function as the light source information acquisition section 120, the light source state evaluation section 121, the projection image acquisition section 122, the imaging control section 123, the projection control section 124, the parameter generation section 125, and the image processing section 129 shown in FIG. 3. The parameter generation section 125 specifically functions as the new parameter generation section 126, the image information conversion section 127, and the table generation section 128.

The communication section 13 includes, for example, an interface substrate including a connector and an interface circuit, and has the function of receiving a variety of pieces of information from the external storage apparatus, the external server, or any other apparatus and the function of transmitting a variety of pieces of information to the external storage apparatus, the external server, or any other apparatus. It is assumed in the present embodiment that the communication section 13 is communicatively connected to a personal computer that is not shown and acquires the projection image information 113 from the personal computer. The projection image information 113 may instead be stored in the storage 11 in advance.

The operation section 14 accepts input operation directed to the projector 1 from the user of the projector 1. The operation section 14 may include, for example, a touch panel or operation buttons on the enclosure of the projector 1.

When the operation section 14 includes a touch panel, the operation section 14 outputs data representing a detected touch position to the controller 12. When the operation section 14 includes operation buttons, the operation section 14 outputs data that identifies a pressed button to the controller 12. The content of the input operation directed to the projector 1 is thus transmitted to the controller 12.

The projection unit 15 projects image light based on the projection image information 113 to display the projection image G on the screen SC under the control of the projection control section 124. The projection unit 15 displays the pattern image GP on the screen SC by individually driving the three light sources, the red light source 151, the green light source 152, and the blue light source 153, provided in the light source unit 150 under the control of the projection control section 124. The pattern image GP collectively represents a red pattern image GPR projected with the light emitted by the red light source 151, a green pattern image GPG projected with the light emitted by the green light source 152, and a blue pattern image GPB projected with the light emitted by the blue light source 153.

The red light source 151 provided in the light source unit 150 includes a semiconductor laser device that emits red laser light characterized by a wavelength spectrum having a peak, for example, in the vicinity of 640 nm. The green light source 152 provided in the light source unit 150 includes a semiconductor laser device that emits green laser light characterized by a wavelength spectrum having a peak, for example, in the vicinity of 520 nm. The blue light source 153 provided in the light source unit 150 includes a semiconductor laser device that emits blue laser light characterized by a wavelength spectrum having a peak, for example, in the vicinity of 450 nm. The laser light emitted from each of the semiconductor laser devices provided in the red light source 151, the green light source 152, and the blue light source 153 is diffused by a diffuser provided in the light source.

Solid-state light sources, such as semiconductor laser devices and light emitting diodes, emit light the wavelength of which may change due to temperature fluctuation. The change in the wavelength results, for example, from the fact that the size of the bandgap of the semiconductor that forms a light emitting diode fluctuates with temperature. In the case of a semiconductor laser device, the change in the wavelength results, for example, from changes in the optical path length of the resonator due, for example, to refractive index variation caused by temperature fluctuation. The temperature fluctuation results from the ambient temperature around the projector, heat exhausted from the projector, heat generated by the devices in accordance with the current applied to the light sources, and other factors.

The light modulation unit 154 includes optical modulators that each modulate the light incident thereon to generate image light based on the projection image information 113 under the control of the projection control section 124. The light modulation unit 154 may specifically include, for example, DMDs or liquid crystal panels. Note that DMD is an abbreviation for a digital mirror device. It is assumed in the present embodiment that the light modulation unit 154 includes three transmissive liquid crystal panels, the R panel 155, the G panel 156, and the B panel 157.

The light emitted from the light source unit 150 enters the light modulation unit 154. Specifically, the light emitted from the red light source 151 is incident on the R panel 155 provided in the light modulation unit 154. The light incident on the R panel 155 is modulated into red image light. The light emitted from the green light source 152 is incident on the G panel 156 provided in the light modulation unit 154.

The light incident on the G panel 156 is modulated into green image light. The light emitted from the blue light source 153 is incident on the B panel 157 provided in the light modulation unit 154. The light incident on the B panel 157 is modulated into blue image light. The red image light modulated by the R panel 155, the green image light modulated by the G panel 156, and the blue image light modulated by the B panel 157 are combined with one another by the light combining system 158 including a cross dichroic prism or any other component that is not shown.

The projection system 159 includes a lens group that projects the image light to display an image on the screen SC. The combined image light from the light combining system 158 is projected onto the screen SC via the projection system 159.

The light source information generator 16 generates the light source information JLS for identifying the state of the light source unit 150 provided in the projection unit 15 based on the results of a variety of types of measurement. The light source information generator 16 includes, for example, a wavelength information generation section 161, which generates wavelength information JWL, which is information on the wavelength of the light emitted by the light source unit 150, a temperature information generation section 162, which generates temperature information JST, which is information on the temperature of the light source unit 150, and a current information generation section 163, which generates current information JEC, which is information on the current supplied to the light source unit 150. The light source information JLS contains the wavelength information JWL generated by the wavelength information generation section 161, the temperature information JST generated by the temperature information generation section 162, and the current information JEC generated by the current information generation section 163. The wavelength information generation section 161 is, for example, an optical measurer, an example of which is a spectrometer or an optical wavelength meter. The temperature information generation section 162 is, for example, a thermometer, an example of which is a thermistor or a radiation thermometer. Since the temperatures of the light emitters of the light source unit 150 cannot be directly measured in some cases, the temperature information generation section 162 may measure, for example, the temperature of an enclosure portion that covers part or entirety of the light emitters of the light source unit 150. The current information generation section 163 is, for example, an ammeter. The light source information generator 16 specifically generates information for identifying the state of each of the red light source 151, the green light source 152, and the blue light source 153 provided in the light source unit 150. For example, to identify the state of each of the light sources based on the wavelength of the light, the wavelength information JWL generated by the wavelength information generation section 161 contains information on the wavelength of the light emitted by the red light source 151, the information identifying the state of the red light source 151, information on the wavelength of the light emitted by the green light source 152, the information identifying the state of the green light source 152, and information on the wavelength of the light emitted by the blue light source 153, the information identifying the state of the blue light source 153.

The imaging section 17 is a digital camera including an imaging lens 171, which collects light reflected off screen SC, a color filter 172, which spectroscopically separates the light incident thereon to transmit light having a specific wavelength, an imaging device 173, which converts the collected light into an electrical signal, and an A/D converter 174, which converts the electrical signal outputted by the imaging device 173 from an analog signal to a digital signal. The color filter 172 has a configuration in which three types of filters are arranged in a predetermined pattern, the three types of filters formed of an R filter that transmits red light, a G filter that transmits green light, and a B filter that transmits blue light. The imaging device 173 is, for example, an image sensor an example of which is a CCD or a CMOS device. CCD is an abbreviation for a charge coupled device, and CMOS is an abbreviation for a complementary metal oxide semiconductor. The imaging section 17 may be provided at a location outside the projector 1. Specifically, the imaging section 17 may be fixed to the outer side of the enclosure of the projector 1.

The imaging section 17 captures an image of the pattern image GP displayed on the screen SC under the control of the imaging control section 123. The imaging section 17 then acquires the pattern image information 112 based on the result of the capture of an image of the pattern image GP. The imaging section 17 specifically acquires imaging information JPR by capturing an image of the red pattern image GPR. The imaging section 17 acquires imaging information JPG by capturing an image of the green pattern image GPG. The imaging section 17 acquires imaging information JPB by capturing an image of the blue pattern image GPB. The pattern image information 112 contains the imaging information JPR, the imaging information JPG, and the imaging information JPB. It is assumed that the colors of an image based on the pattern image information 112 are expressed by the tristimulus values based on the RGB color system. That is, the pattern image information 112 contains information on the colors expressed by the RGB color system. In the present embodiment, the information on the colors expressed by the RGB color system is referred to as RGB information JCR in some cases. The tristimulus values based on the RGB color system are referred to as RGB values in some cases. The RGB values include R, G, and B values.

The projection image acquisition section 122 controls the communication section 13 to acquire the projection image information 113 from an external terminal, such as a personal computer communicably connected to the projector 1. The projection image acquisition section 122 stores the acquired projection image information 113 in the storage 11.

The projection control section 124 controls the projection unit 15 to project the image light for displaying the projection image G on the screen SC.

The projection control section 124 controls the projection unit 15 to project image light for displaying the pattern image GP on the screen SC. Specifically, the projection control section 124 controls the projection unit 15 to project image light for displaying the red pattern image GPR on the screen SC. At this point, only the red light source 151 is driven, while the green light source 152 or the blue light source 153 is not driven. The projection control section 124 controls the projection unit 15 to project image light for displaying the green pattern image GPG on the screen SC. At this point, only the green light source 152 is driven, while the blue light source 153 or the red light source 151 is not driven. The projection control section 124 controls the projection unit 15 to project image light for displaying the blue pattern image GPB on the screen SC. At this point, only the blue light source 153 is driven, while the red light source 151 or the green light source 152 is not driven.

The imaging control section 123 controls the imaging section 17 to cause it to capture an image of the pattern image GP displayed on the screen SC. The imaging control section 123 then acquires the pattern image information 112 based on the result of the capture of an image of the pattern image GP from the imaging section 17. The imaging control section 123 stores the acquired pattern image information 112 in the storage 11. The imaging control section 123 specifically controls the imaging section 17 to cause it to capture an image of the red pattern image GPR displayed on the screen SC. The imaging control section 123 then acquires the imaging information JPR based on the result of the capture of an image of the red pattern image GPR from the imaging section 17 and stores the acquired information as the pattern image information 112 in the storage 11. The imaging control section 123 controls the imaging section 17 to cause it to capture an image of the green pattern image GPG displayed on the screen SC. The imaging control section 123 then acquires the imaging information JPG based on the result of the capture of an image of the green pattern image GPG from the imaging section 17 and stores the acquired information as the pattern image information 112 in the storage 11. The imaging control section 123 controls the imaging section 17 to cause it to capture an image of the blue pattern image GPB displayed on the screen SC. The imaging control section 123 then acquires the imaging information JPB based on the result of the capture of an image of the blue pattern image GPB from the imaging section 17 and stores the acquired information as the pattern image information 112 in the storage 11.

The light source information acquisition section 120 controls the light source information generator 16 to cause it to generate the light source information JLS for identifying the state of the light source unit 150. The light source information acquisition section 120 then acquires the light source information JLS from the light source information generator 16. The light source information acquisition section 120 identifies the state of the light source unit 150 based on the acquired light source information JLS. In the present embodiment, the light source information JLS contains the wavelength information JWL, the temperature information JST, and the current information JEC. That is, the light source information acquisition section 120 identifies the wavelength of the light emitted by the light source unit 150 based on the acquired wavelength information JWL. The light source information acquisition section 120 identifies the temperature of the light source unit 150 based on the acquired temperature information JST. The light source information acquisition section 120 identifies the value of the current supplied to the light source unit 150 based on the acquired current information JEC.

The light source state evaluation section 121 evaluates the state of the light source unit 150 based on the light source information JLS. In the first embodiment, the light source state evaluation section 121 determines the state of the light source unit 150 by selecting one of the following three states: a low temperature state; a high temperature state; and the other state. The low temperature state is the state in which the temperature of the light source unit 150 is 0° C. The high temperature state is the state in which the temperature of the light source unit 150 is 50° C. The other state is any of a state in which the temperature of the light source unit 150 is lower than 0° C., a state in which the temperature of the light source unit 150 is higher than 50° C., and a state in which the temperature of the light source unit 150 is higher than 0° C. but lower than 50° C.

The function of the parameter generation section 125 and a method for generating the correction parameters PmC in the projector 1 according to the first embodiment will be described below with reference to FIGS. 3 and 17.

Figure 17:
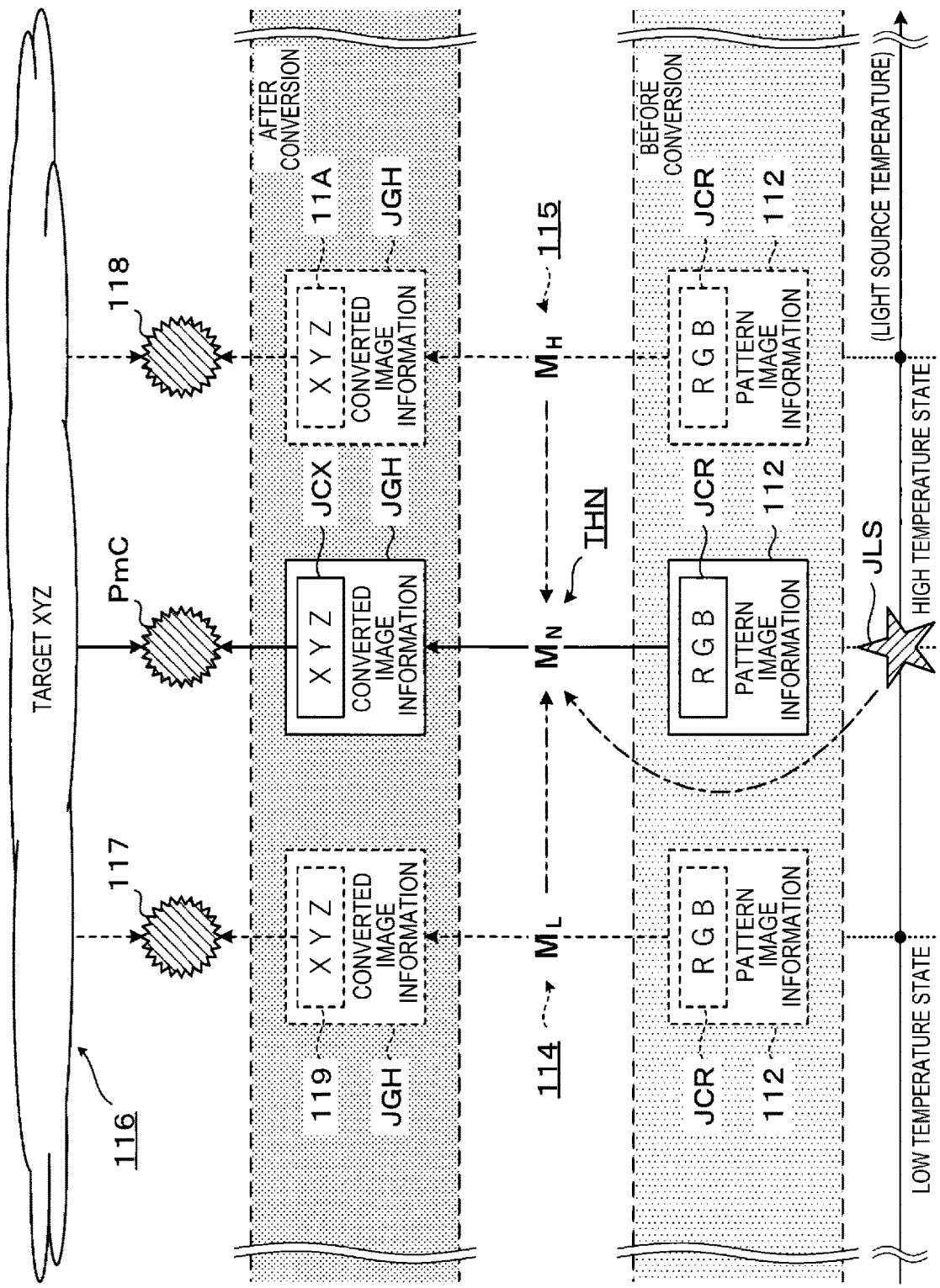
FIG. 17 is a conceptual view for describing the process of generating correction parameters in the projector according to the first embodiment.

FIG. 17 is a conceptual view for describing the process of generating the correction parameters PmC in the projector 1 according to the first embodiment. In the present embodiment, the projector 1 generates a new conversion table THN based on the light source information JLS based on the state of the light source unit 150, the low-temperature conversion table 114, and the high-temperature conversion table 115. The projector 1 converts the pattern image information 112 acquired by the imaging section 17 based on the new conversion table THN into converted image information JGH. The projector 1 then generates the correction parameters PmC for correcting the projection image G based on the converted image information JGH and the target XYZ information 116. The correction parameters PmC are parameters for correcting the state of the displayed projection image G in such a way that the state becomes an ideal state or a state close to the ideal state. The correction parameters PmC are specifically parameters for correcting the color, the brightness, and other factors of the projection image G. The correction parameters PmC contain, for example, information on the colors expressed by the RGB color system.

The parameter generation section 125 generates the correction parameters PmC for correcting the projection image G based on the light source information JLS, in other words, based on the state of the light source unit 150. The parameter generation section 125 also has the functions of the new parameter generation section 126, the image information conversion section 127, and the table generation section 128, as described above.

The table generation section 128 generates the new conversion table THN, which converts the pattern image information 112 into the converted image information JGH. The table generation section 128 specifically generates the new conversion table THN based on the light source information JLS, the low-temperature conversion table 114, and the high-temperature conversion table 115. The low-temperature conversion table 114, the high-temperature conversion table 115, and the new conversion table THN are used to convert the pattern image information 112 into the converted image information JGH, and specifically used to convert the RGB information JCR contained in the pattern image information 112 into information on the colors expressed by a color system different from the RGB color system. In other words, the low-temperature conversion table 114, the high-temperature conversion table 115, and the new conversion table THN are used to convert the color system for expressing the colors of an image based on the pattern image information 112 from the RGB color system into a color system different from the RGB color system. In the first embodiment, it is assumed that the color system different from the RGB color system is the XYZ color system. That is, the low-temperature conversion table 114, the high-temperature conversion table 115, and the new conversion table THN are each a matrix having three rows and three columns for converting the colors of an image based on the pattern image information 112 from the tristimulus values based on the RGB color system into the tristimulus values based on the XYZ color system. In the present embodiment, the information on the colors expressed by the color system different from the RGB color system is information on the colors expressed by the XYZ color system, and the information may be referred as XYZ information JCX. The tristimulus values based on the XYZ color system may be referred to as XYZ values. The XYZ values include X, Y, and Z values.

In the present embodiment, the low-temperature conversion table 114, the high-temperature conversion table 115, and the new conversion table THN may be collectively referred to as a conversion table TH.

The low-temperature conversion table 114 is, for example, so set that the RGB values of an image based on the pattern image information 112 acquired by the imaging section 17 through capture of an image of the pattern image GP in the low temperature state before shipment of the projector 1 can be converted into values equal to the XYZ values acquired by a dedicated colorimeter through measurement of the pattern image GP. In the low temperature state, the XYZ information JCX produced by converting the RGB information JCR contained in the pattern image information 112 acquired before the shipment of the projector 1 based on the low-temperature conversion table 114 may be referred to as low-temperature XYZ information 119. The correction parameters PmC generated based on the low-temperature XYZ information 119 and the target XYZ information 116 may be referred to as low-temperature correction parameters 117.

The high-temperature conversion table 115 is, for example, so set that the RGB values of an image based on the pattern image information 112 acquired by the imaging section 17 through capture of an image of the pattern image GP in the high temperature state before shipment of the projector 1 can be converted into values equal to the XYZ values acquired by the dedicated colorimeter through measurement of the pattern image GP. In the high temperature state, the XYZ information JCX produced by converting the RGB information JCR contained in the pattern image information 112 acquired before the shipment of the projector 1 based on the high-temperature conversion table 115 may be referred to as high-temperature XYZ information 11A. The correction parameters PmC generated based on the high-temperature XYZ information 11A and the target XYZ information 116 may be referred to as high-temperature correction parameters 118.

The new conversion table THN is generated based on the light source information JLS, the low-temperature conversion table 114, and the high-temperature conversion table 115. For example, let $M_N$ be a matrix representing the new conversion table THN, $M_L$ be a matrix representing the low-temperature conversion table 114, and $M_H$ be a matrix representing the high-temperature conversion table 115, and the new conversion table THN may be generated based on an expression $M_N = c \times M_L + (1-c) \times M_H$. In the expression, the value c is determined based on the states of the light sources, in other words, based on the light source information JLS. The value c may, for example, be a real number that satisfies a relational expression $c = (T_H - T_N)/(T_H - T_L)$, where $T_N$ represents the temperature of the light source unit 150 at the time of generation of the new conversion table THN, $T_L$ represents the temperature of the light source unit 150 in the low temperature state, and $T_H$ represents the temperature of the light source unit 150 in the high temperature state. The relationship between the temperatures $T_L$ and $T_H$ is $T_L < T_H$. Specifically, when the temperature of the light source unit 150 is found to be 40° C. based on the light source information JLS, the conditions in the present embodiment that the temperature of the light source unit 150 in the low temperature state is 0° C., and the temperature of the light source unit 150 in the high temperature state is 50° C., or the conditions $T_N = 40$, $T_L = 0$, and $T_H = 50$ may be substituted into the second expression in this paragraph, and $M_N = 0.2 \times M_L + 0.8 \times M_H$ may be derived based on the first expression in this paragraph. When the temperature of the light source unit 150 is found to be 0° C. based on the light source information JLS, in other words, when the state of the light source unit 150 is the low temperature state, $T_N=0$, $T_L=0$, and $T_H=50$ may be substituted into the second expression in this paragraph, and $M_N=1 \times M_L$ $0 \times M_H=M_L$ may be derived based on the first expression in this paragraph. That is, when the state of the light source unit 150 is the low temperature state, the RGB information JCR may be converted into the XYZ information JCX based on the low-temperature conversion table 114 corresponding to the low temperature state. Similarly, when the temperature of the light source unit 150 is found to be 50° C. based on the light source information JLS, in other words, when the state of the light source unit 150 is the high temperature state, $T_N=50$, $T_L=0$, and $T_H=50$ may be substituted into the second expression in this paragraph, and $M_N=0 \times M_L+1 \times M_H=M_H$ may be derived based on the first expression in this paragraph. That is, when the state of the light source unit 150 is the high temperature state, the RGB information JCR may be converted into the XYZ information JCX based on the high-temperature conversion table 115 corresponding to the high temperature state.

The image information conversion section 127 converts the pattern image information 112 into the converted image information JGH based on the new conversion table THN. The image information conversion section 127 specifically converts the RGB information JCR contained in the pattern image information 112 into the XYZ information JCX based on the new conversion table THN. When the state of the light source unit 150 is the low temperature state, the image information conversion section 127 converts the RGB information JCR into the XYZ information JCX based on the low-temperature conversion table 114 corresponding to the low temperature state. When the state of the light source unit 150 is the high temperature state, the image information conversion section 127 converts the RGB information JCR into the XYZ information JCX based on the high-temperature conversion table 115 corresponding to the high temperature state. The conversion of the pattern image information 112 into the converted image information JGH based on the conversion table TH may be referred to as image conversion.

The new parameter generation section 126 generates the correction parameters PmC based on the degree of the difference between the XYZ information JCX contained in the converted image information JGH and the target XYZ information 116. The target XYZ information 116 is information on target XYZ values for correcting the state of the displayed projection image G in such a way that the state becomes an ideal state or a state close to the ideal state. The target XYZ information 116 may be set based on the pattern image information 112 produced by capturing an image of the pattern image GP projected from the projector 1 when the state of the displayed projection image G is an ideal state. In a case where a plurality of projectors 1 project image light to display a single projection image G on the screen SC, target XYZ information 116 common to the plurality of projectors 1 may be set to eliminate color unevenness in the projection image G resulting from individual differences among the projectors. The new parameter generation section 126 may generate the correction parameters PmC, for example, by converting XYZ values based on the difference between the XYZ information JCX and the target XYZ information 116 into RGB values by using an inverse matrix of the matrix $M_N$ representing the new conversion table THN.

The image processing section 129 corrects the projection image information 113 based on the correction parameters PmC. In other words, the image processing section 129 corrects the projection image G, which is based on the projection image information 113, based on the correction parameters PmC. The projection image information 113 corrected based on the correction parameters PmC may be referred to as corrected image information JGC. The projection unit 15 projects image light based on the corrected image information JGC to display the projection image G on the screen SC under the control of the projection control section 124. The projection image G corrected based on the correction parameters PmC is, in other words, the projection image G based on the corrected image information JGC.

1.3. Purposes of Color System Conversion and Light Source State Identification The purposes of the color system conversion and the light source state identification in the process of generating the correction parameters PmC for the projector 1 according to the first embodiment will be described below with reference to FIGS. 5 to 8.

Figure 5:
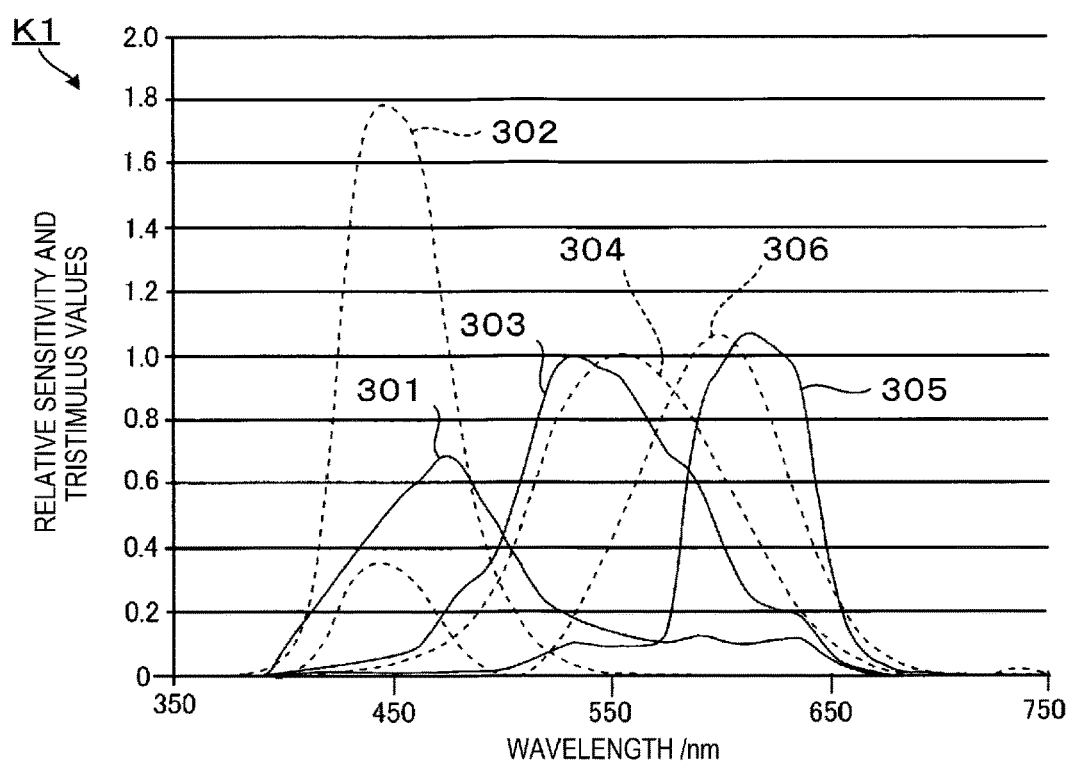
FIG. 5 is a graph showing the spectral sensitivity characteristics of an imaging section and the color matching functions of the XYZ color system.

FIG. 5 is a graph K1 showing the spectral sensitivity characteristics of the imaging section 17 and the color matching functions of the XYZ color system. The graph K1 is drawn based on the horizontal axis representing the wavelength of light and the vertical axis representing the relative sensitivity of the imaging section 17 or the tristimulus values. The solid line 301 shown as part of the graph K1 represents the spectral sensitivity characteristic of the imaging section 17 having captured an image of the blue pattern image GPB projected with the light emitted by the blue light source 153. The solid line 303 shown as part of the graph K1 represents the spectral sensitivity characteristic of the imaging section 17 having captured an image of the green pattern image GPG projected with the light emitted by the green light source 152. The solid line 305 shown as part of the graph K1 represents the spectral sensitivity characteristic of the imaging section 17 having captured an image of the red pattern image GPR projected with the light emitted by the red light source 151. The broken line 302 shown as part of the graph K1 represents the color matching function $z(\lambda)$ of the XYZ color system. The broken line 304 shown as part of the graph K1 represents the color matching function $y(\lambda)$ of the XYZ color system. The broken line 306 shown as part of the graph K1 represents the color matching function $x(\lambda)$ of the XYZ color system. The lines 301, 303, and 305 shown as part of the graph K1 are so normalized that the maximum in the spectral sensitivity characteristic, indicated by the line 303, of the imaging section 17 having captured an image of the green pattern image GPG projected with the light emitted by the green light source 152 is "1.0". The lines 302, 304, and 306 shown as part of the graph K1 are so normalized that the maximum in the color matching function $y(\lambda)$ indicated by the line 304 is "1.0". The symbol $\lambda$ represents the wavelength of light.

Figure 6:
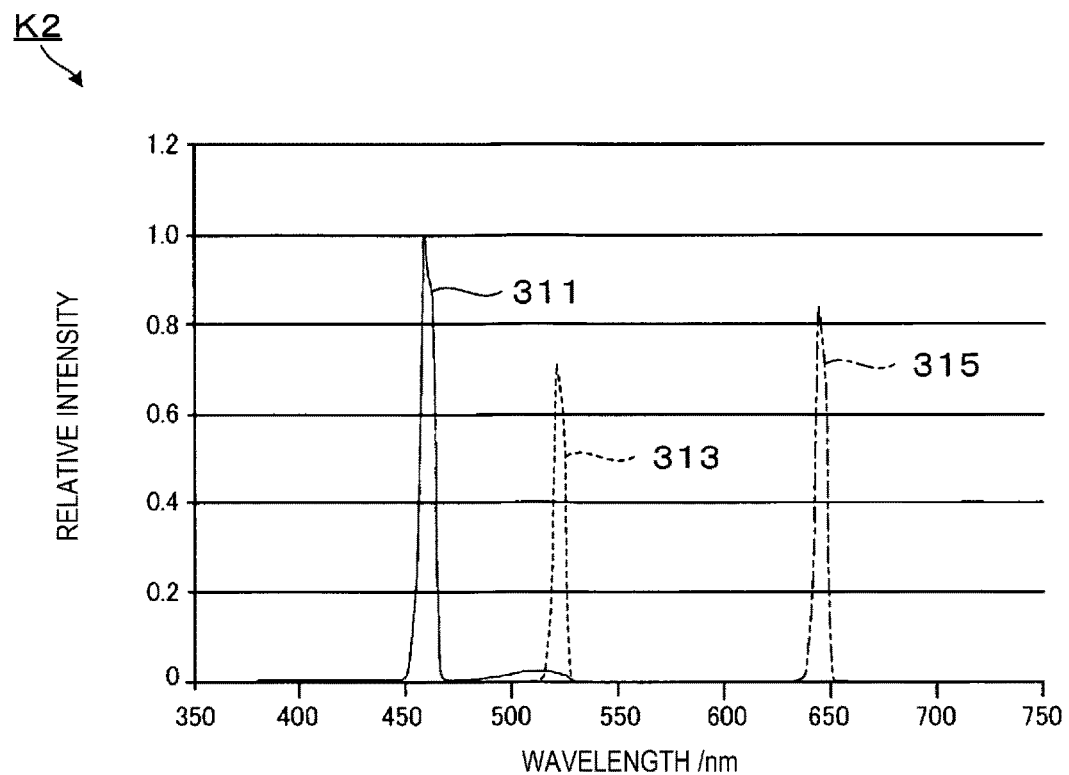
FIG. 6 is a graph showing the wavelength spectrum of the light projected from the projection unit.

FIG. 6 is a graph K2 showing the wavelength spectrum of the light projected from the projection unit 15. The graph K2 is drawn based on the horizontal axis representing the wavelength of light and the vertical axis representing the relative intensity of the light. The solid line 311 shown as part of the graph K2 represents the wavelength spectrum of the light emitted by the blue light source 153. The broken line 313 shown as part of the graph K2 represents the wavelength spectrum of the light emitted by the green light source 152. The dashed line 315 shown as part of the graph K2 represents the wavelength spectrum of the light emitted by the red light source 151.

Figure 7:
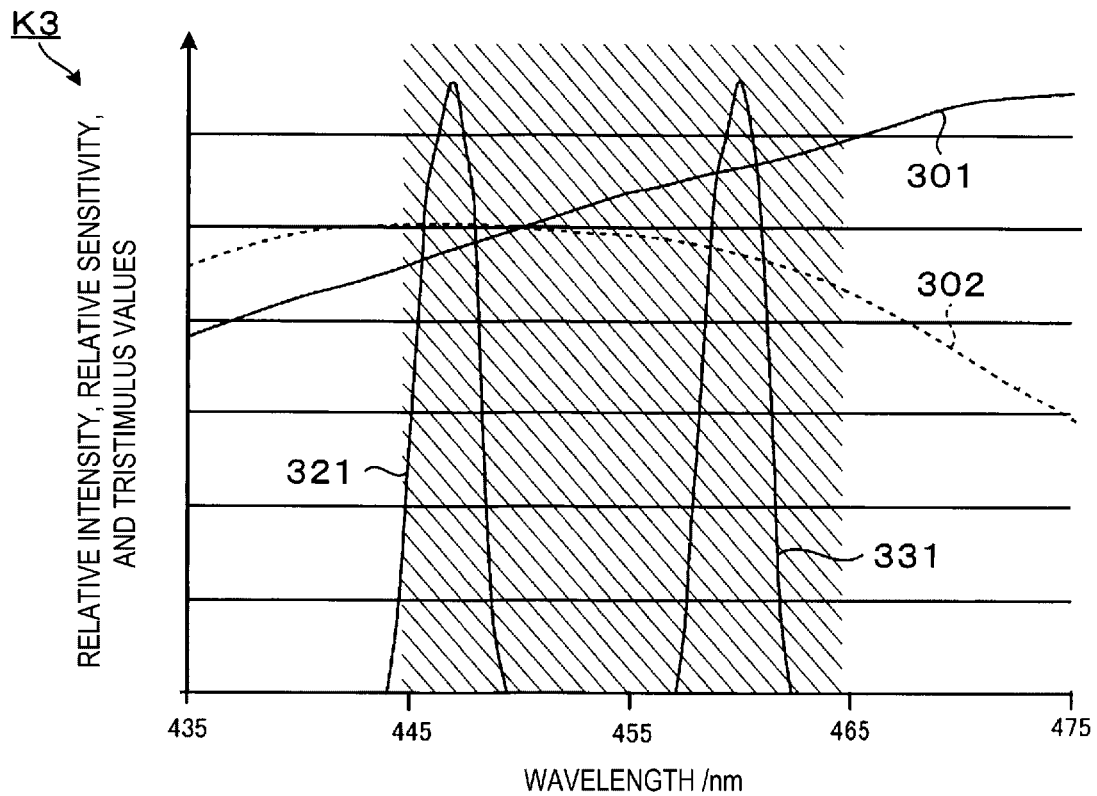
FIG. 7 is a graph showing a peak shift in the wavelength spectrum of the light emitted by a blue light source.

FIG. 7 is a graph K3 showing a peak shift in the wavelength spectrum of the light emitted by the blue light source 153. The solid line 321 shown as part of the graph K3 represents the wavelength spectrum of the light emitted by the blue light source 153 before the wavelength position indicating the peak shifts. The solid line 331 shown as part of the graph K3 represents the wavelength spectrum of the light emitted by the blue light source 153 after the wavelength position indicating the peak shifts. The graph K3 is a graph drawn based on the graph K2 and representing superimposition of the line 301, which shows the spectral sensitivity characteristic of the imaging section 17 having captured an image of the blue pattern image GPB projected with the light emitted by the blue light source 153, and the line 302, which shows the color matching function $z(\lambda)$ of the XYZ color system. For convenience of the description, the positions and scales of the lines 301 and 302 in the vertical axis direction in the graph K3 may differ from the positions and scales of the lines 301 and 302 in the graph K1. In the graph K3, the range of the wavelength of the light from 445 to 465 nm is the range over which the peak position in the wavelength spectrum of the light emitted by the blue light source 153 can shift, and this range is hatched in the form of shaded hatching.

Figure 8:
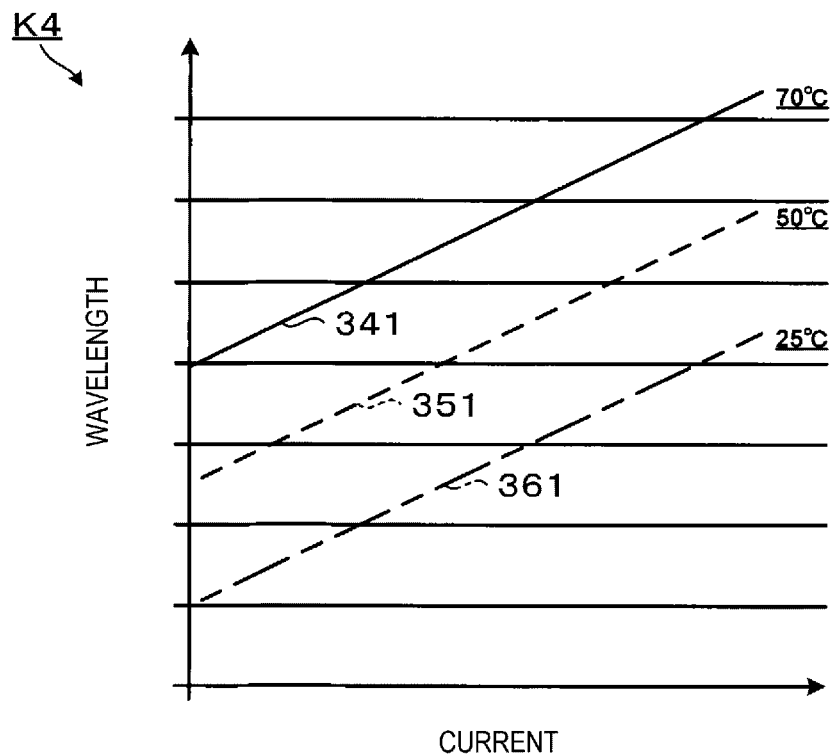
FIG. 8 is a graph diagrammatically showing the relationship among the peak wavelength in the wavelength spectrum of the light emitted by the blue light source, the temperature of the blue light source, and the value of the current supplied to the blue light source.

FIG. 8 is a graph K4 diagrammatically showing the relationship among the peak wavelength in the wavelength spectrum of the light emitted by the blue light source 153, the temperature of the blue light source 153, and the value of the current supplied to the blue light source 153. The graph K4 is drawn based on the horizontal axis representing the value of the current supplied to the blue light source 153 and the vertical axis representing the peak wavelength in the wavelength spectrum of the light emitted by the blue light source 153. The solid line 341 shown as part of the graph K4 shows the relationship between the peak wavelength in the wavelength spectrum of the light emitted by the blue light source 153 and the value of the current supplied to the blue light source 153 when the temperature of the blue light source 153 is 70° C. The broken line 351 shown as part of the graph K4 shows the relationship between the peak wavelength in the wavelength spectrum of the light emitted by the blue light source 153 and the value of the current supplied to the blue light source 153 when the temperature of the blue light source 153 is 50° C. The dashed line 361 shown as part of the graph K4 shows the relationship between the peak wavelength in the wavelength spectrum of the light emitted by the blue light source 153 and the value of the current supplied to the blue light source 153 when the temperature of the blue light source 153 is 25° C.

The XYZ color system is a color system constructed from scientifically characterized data on color vision characteristics based on the activity of human photoreceptor cells. The color matching functions $x(\lambda)$, $y(\lambda)$, and $z(\lambda)$ based on the XYZ color system are functions configured to reproduce the spectral sensitivity characteristic of the human eye.

There are differences between the lines 302, 304, and 306, which represent the color matching functions based on the XYZ color system, and the lines 301, 303, and 305, which represent the spectral sensitivity characteristics of the imaging section 17, as shown in FIG. 5. In other words, it can be said that the spectral sensitivity characteristic of the imaging section 17 does not coincide with the spectral sensitivity characteristic of the human eye. That is, when the pattern image information 112 based on the spectral response characteristic of the imaging section 17 is used to correct the projection image information 113, the projection image G based on the corrected projection image information 113 may not be a preferable correction result when viewed with the human eye due to the fact that the spectral sensitivity characteristic of the imaging section 17 is not close to the color matching functions.

In the present embodiment, the target XYZ information 116, which is information on target values in the image correction, is set by the XYZ values, which are the tristimulus values based on the XYZ color system. The RGB information JCR contained in the pattern image information 112 acquired by the imaging section 17 is converted into the XYZ information JCX. The projector 1 then generates the correction parameters PmC based on the XYZ information JCX and the target XYZ information 116. That is, the projector 1 according to the present embodiment can perform correction based on the spectral sensitivity characteristic of the human eye by converting the color system of an image based on the pattern image information 112 into the XYZ color system in the process of generating the correction parameters PmC.

The term "human" used herein corresponds to a "standard observer", and the "spectral sensitivity characteristic of the human eye" is assumed to correspond to "color matching functions based on the XYZ color system".

The peak position in the wavelength spectrum of the light emitted by the blue light source 153, in other words, the peak wavelength, may change, as shown in FIGS. 7 and 8 as an example. The change results from the fact that the semiconductor laser device that forms the blue light source 153 is affected by temperature fluctuation, as described above. Fluctuation of the temperature of the blue light source 153 results, for example, from fluctuation of the temperature in the surroundings of the blue light source 153 and the heat generated by the device in accordance with the current supplied to the blue light source 153. That is, the wavelength spectrum of the light emitted by the blue light source 153 changes in accordance with the state of the blue light source 153. In other words, the color of the light emitted by the blue light source 153 changes in accordance with the state of the blue light source 153. The wavelength of the light emitted by the blue light source 153 may be directly identified by measuring the light emitted by the blue light source 153. The wavelength of the light emitted by the blue light source 153 may instead be indirectly identified by measuring the temperature of the blue light source 153 and the value of the current supplied to the blue light source 153 based on the relationship shown in FIG. 8. Still instead, the wavelength of the light emitted by the blue light source 153 may be identified by holding one of the temperature of the blue light source 153 and the value of the current supplied to the blue light source 153 constant and measuring the other. In FIG. 7, the positions of the intersections of the line 321 and the line 301 are lower than the positions of the intersections of the line 321 and the line 302. On the other hand, the positions of the intersections of the line 331 and the line 301 are higher than the positions of the intersections of the line 331 and the line 302. The fact described above indicates in the case where the wavelength spectrum of the light emitted by the blue light source 153 changes in accordance with the state of the blue light source 153 that there is a change in the relative relationship in terms of brightness of the blue pattern image GPB, for example, between a case where the blue pattern image GPB displayed on the screen SC is checked with the human eye and a case where the blue pattern image GPB is checked based on the result of the imaging performed by the imaging section 17. The aforementioned characteristics of the blue light source 153 hold true for the green light source 152 and the red light source 151. That is, the projector 1 according to the present embodiment can grasp the wavelength spectrum of the light emitted by the light source unit 150 in detail by identifying the state of the light source unit 150 in the process of generating the correction parameters PmC, and as a result can generate the correction parameters PmC containing only a small amount of incorrectness.

The wavelength spectrum of the light emitted by the blue light source 153, the wavelength spectrum of the light emitted by the green light source 152, and the wavelength spectrum of the light emitted by the red light source 151 differ from one another in terms of the peak position, the shape of the spectrum, and other factors, as shown in FIG. 6. Furthermore, the temperatures of the blue light source 153, the green light source 152, and the red light source 151 do not necessarily coincide with one another, and in addition, the values of the current supplied to the blue light source 153, the green light source 152, and the red light source 151 do not necessarily coincide with one another as well. The projector 1 according to the present embodiment can therefore generate the correction parameters PmC with higher accuracy by separately identifying the state of the blue light source 153, the state of the green light source 152, and the state of the red light source 151.

1.4. Action of Projector

Figure 9:
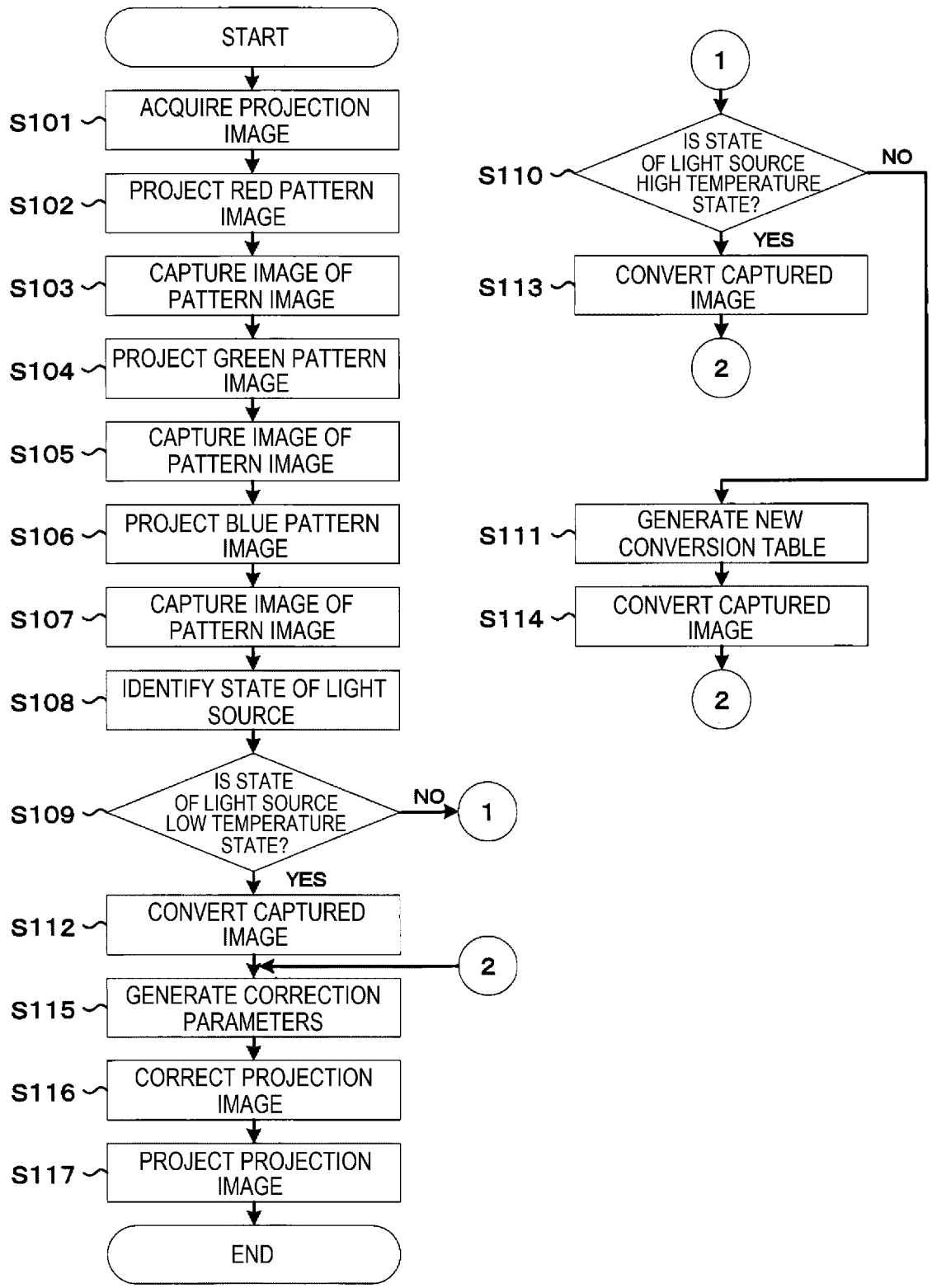
FIG. 9 is a flowchart for describing the action of the projector according to the first embodiment.

FIG. 9 is a flowchart for describing the action of the projector 1 according to the first embodiment. A series of actions shown in the flowchart starts, for example, when the projector 1 is powered on and the operation section 14 accepts input operation relating to the start of the actions from the user of the projector 1.

In step S101, the projection image acquisition section 122 controls the communication section 13 to cause it to acquire the projection image information 113 from the personal computer communicably connected to the projector 1. The projection image acquisition section 122 stores the acquired projection image information 113 in the storage 11.

In step S102, the projection control section 124 controls the projection section 15 to cause it to project the image light for displaying the red pattern image GPR on the screen SC. The red pattern image GPR is displayed on the screen SC.

In step S103, the imaging control section 123 controls the imaging section 17 to cause it to capture an image of the red pattern image GPR displayed on the screen SC. The imaging control section 123 then acquires the imaging information JPR based on the result of the capture of an image of the red pattern image GPR from the imaging section 17 and stores the acquired information as the pattern image information 112 in the storage 11.

In step S104, the projection control section 124 controls the projection section 15 to cause it to project the image light for displaying the green pattern image GPG on the screen SC. The green pattern image GPG is displayed on the screen SC.

In step S105, the imaging control section 123 controls the imaging section 17 to cause it to capture an image of the green pattern image GPG displayed on the screen SC. The imaging control section 123 then acquires the imaging information JPG based on the result of the capture of an image of the green pattern image GPG from the imaging section 17 and stores the acquired information as the pattern image information 112 in the storage 11.

In step S106, the projection control section 124 controls the projection section 15 to cause it to project the image light for displaying the blue pattern image GPB on the screen SC. The blue pattern image GPB is displayed on the screen SC.

In step S107, the imaging control section 123 controls the imaging section 17 to cause it to capture an image of the blue pattern image GPB displayed on the screen SC. The imaging control section 123 then acquires the imaging information JPB based on the result of the capture of an image of the blue pattern image GPB from the imaging section 17 and stores the acquired information as the pattern image information 112 in the storage 11.

In step S108, the light source information acquisition section 120 controls the light source information generator 16 to cause it to generate the light source information JLS for identifying the state of the light source unit 150. The light source information acquisition section 120 then acquires the light source information JLS from the light source information generator 16. The light source information acquisition section 120 identifies the state of the light source unit 150 based on the acquired light source information JLS.

In step S109, the light source state evaluation section 121 evaluates whether or not the state of the light source unit 150 is the low temperature state based on the light source information JLS. When the result of the evaluation in step S109 is affirmative, that is, when the result is YES in step S109, the light source state evaluation section 121 proceeds to the process in step S112. When the result of the evaluation in step S109 is negative, that is, when the result is NO in step S109, the light source state evaluation section 121 proceeds to the process in step S110.

In step S110, the light source state evaluation section 121 evaluates whether or not the state of the light source unit 150 is the high temperature state based on the light source information JLS. When the result of the evaluation in step S110 is affirmative, that is, when the result is YES in step S110, the light source state evaluation section 121 proceeds to the process in step S113. When the result of the evaluation in step S110 is negative, that is, when the result is NO in step S110, the light source state evaluation section 121 proceeds to the process in step S111.

In step S111, the table generation section 128 generates the new conversion table THN based on the light source information JLS, the low-temperature conversion table 114, and the high-temperature conversion table 115.

In step S112, the image information conversion section 127 converts the pattern image information 112 into the converted image information JGH based on the low-temperature conversion table 114 corresponding to the low temperature state. The image information conversion section 127 specifically converts the RGB information JCR contained in the pattern image information 112 into the XYZ information JCX based on the low-temperature conversion table 114 corresponding to the low temperature state.

In step S113, the image information converter 127 converts the pattern image information 112 into the conversion image information JGH based on the high temperature conversion table 115 corresponding to the high temperature state. The image information conversion section 127 specifically converts the RGB information JCR contained in the pattern image information 112 into the XYZ information JCX based on the high-temperature conversion table 115 corresponding to the high temperature state.

In step S114, the image information conversion section 127 converts the pattern image information 112 into the converted image information JGH based on the new conversion table THN. The image information conversion section 127 specifically converts the RGB information JCR contained in the pattern image information 112 into the XYZ information JCX based on the new conversion table THN.

In step S115, the new parameter generation section 126 generates the correction parameters PmC based on the degree of the difference between the XYZ information JCX, which is generated by converting the RGB information JCR contained in the pattern image information 112 in step S112, S113, or S114, and the target XYZ information 116.

When the states of the light sources are each the low temperature state, the projector 1 converts the RGB information JCR into the XYZ information JCX based on the low-temperature conversion table 114 corresponding to the low temperature state, and generates the correction parameters PmC based on the degree of the difference between the XYZ information JCX and the target XYZ information 116. That is, when the states of the light sources are each the low temperature state, the projector 1 generates the correction parameters PmC based on the low-temperature conversion table 114 corresponding to the low temperature state.

When the states of the light sources are each the high temperature state, the projector 1 converts the RGB information JCR into the XYZ information JCX based on the high-temperature conversion table 115 corresponding to the high temperature state, and generates the correction parameters PmC based on the degree of the difference between the XYZ information JCX and the target XYZ information 116. That is, when the states of the light sources are each the high temperature state, the projector 1 generates the correction parameters PmC based on the high-temperature conversion table 115 corresponding to the high temperature state.

When the states of the light sources are each the other state, the projector 1 generates the new conversion table THN based on the light source information JLS, the low-temperature conversion table 114, and the high-temperature conversion table 115, and converts the RGB information JCR into the XYZ information JCX based on the new conversion table THN. The projector 1 then generates the correction parameters PmC based on the degree of the difference between the XYZ information JCX and the target XYZ information 116.

In step S116, the image processing section 129 corrects the projection image information 113 based on the correction parameters PmC. That is, the image processing section 129 generates the corrected image information JGC based on the correction parameters PmC and the projection image information 113.

In step S117, the projection control section 124 controls the projection section 15 to cause it to project the image light for displaying the projection image G based on the corrected image information JGC on the screen SC. The projection image G based on the corrected image information JGC is displayed on the screen SC.

The controller 12 then terminates the series of actions shown in the flowchart.

The state of the light source unit 150 may change over time. The projector 1 may therefore perform the series of actions shown in the flowchart in FIG. 9 at fixed time intervals. As a result, even when the state of the displayed projection image G changes over time, the projector 1 can appropriately correct the projection image G and maintain an ideal of the displayed projection image G or a state close to the ideal state.

As described above, according to the first embodiment, the correction parameters PmC for correcting the projection image G can be generated with high accuracy by identifying the state of the light source unit 150 and selecting or generating the conversion table TH based on the state of the light source unit 150. The projector 1 can therefore use the correction parameters PmC to achieve an ideal state of the displayed projection image G or a state close to the ideal state.

According to the first embodiment, to identify the state of the light source unit 150, a plurality of pieces of information, such as the wavelength information JWL, the temperature information JST, and the current information JEC, can be used to accurately identify the state of the light source unit 150. The projector 1 can thus generate the correction parameters PmC containing only a small amount of incorrectness.

According to the first embodiment, to generate the correction parameters PmC, target values in the image correction are set by the XYZ values, which are the tristimulus values based on the XYZ color system, and the RGB information JCR contained in the pattern image information 112 is converted into the XYZ information JCX, whereby the projection image G can be corrected based on the spectral sensitivity characteristic of the human eye. The projector 1 can therefore create a state in which the state of the displayed projection image G looks ideal when seen with the human eye.

According to the first embodiment, the correction parameters PmC can be generated without use of a special optical filter called a Z filter. The projector 1 can therefore correct the projection image G without complication of the configuration of the projector.

As described above, the method for controlling the projector 1 according to the first embodiment is a method for controlling the projector 1 including the light source unit 150 and includes identifying the state of the light source unit 150, generating the correction parameters PmC based on the state of the light source unit 150, and correcting the projection image G projected from the projector 1 based on the correction parameters PmC.

The projector 1 according to the first embodiment includes the light source unit 150, the light source information acquisition section 120, which identifies the state of the light source unit 150, the parameter generation section 125, which generates the correction parameters PmC based on the state of the light source unit 150, the image processing section 129, which corrects the projection image G based on the correction parameters PmC, and the projection section 15, which projects the projection image G corrected based on the correction parameters PmC.

The program 111 according to the first embodiment causes the controller 12 to function as the light source information acquisition section 120, which identifies the state of the light source unit 150 provided in the projector 1, the parameter generation section 125, which generates the correction parameters PmC based on the state of the light source unit 150, and the image processing section 129, which corrects the projection image G projected from the projector 1 based on the correction parameters PmC.

That is, the projector 1 according to the present embodiment can correct the projection image G by identifying the state of the light source unit 150 and using the correction parameters PmC generated based on the state of the light source unit 150 even when the state of the displayed projection image G changes due to changes in the state of the light source unit 150. The projector 1 having a simple configuration can thus achieve an ideal state of the displayed projection image G or a state close to the ideal state without use of a Z filter or without complication of the configuration of the projector.

In the first embodiment, the projector 1 is an example of a "projector", the light source unit 150 is an example of a "light source", the correction parameters PmC are an example of a "correction parameter", the projection image G is an example of an "image", the light source information acquisition section 120 is an example of a "light source state identification section", the parameter generation section 125 is an example of a "parameter generation section", the image processing section 129 is an example of an "image processing section", the projection unit 15 is an example of a "projection section", the program 111 is an example of a "program", and the controller 12 is an example of a "processor".

In the method for controlling the projector 1 according to the first embodiment, identifying the state of the light source unit 150 includes identifying the wavelength of the light emitted by the light source unit 150.

That is, the projector 1 according to the present embodiment identifies the state of the light source unit 150 based on the wavelength of the light emitted by the light source unit 150. The projector 1 can thus grasp in detail changes in the wavelength spectrum of the light emitted by the light source unit 150 resulting from changes in the state of the light source unit 150.

In the method for controlling the projector 1 according to the first embodiment, identifying the state of the light source unit 150 includes identifying the temperature of the light source unit 150.

That is, the projector 1 according to the present embodiment identifies the state of the light source unit 150 based on the temperature of the light source unit 150. The projector 1 can thus grasp changes in the wavelength spectrum of the light emitted by the light source unit 150 resulting from changes in the state of the light source unit 150.

In the method for controlling the projector 1 according to the first embodiment, identifying the state of the light source unit 150 includes identifying the value of the current supplied to the light source unit 150.

That is, the projector 1 according to the present embodiment identifies the state of the light source unit 150 based on the value of the current supplied to the light source unit 150. The projector 1 can thus grasp changes in the wavelength spectrum of the light emitted by the light source unit 150 resulting from changes in the state of the light source unit 150.

In the method for controlling the projector 1 according to the first embodiment, when the state of the light source unit 150 is the low temperature state, generating the correction parameters PmC based on the state of the light source unit 150 includes generating the correction parameters PmC based on the low-temperature conversion table 114 corresponding to the low temperature state, and when the state of the light source unit 150 is the high temperature state, generating the correction parameters PmC based on the state of the light source unit 150 includes generating the correction parameters PmC based on the high-temperature conversion table 115 corresponding to the high temperature state.

That is, the projector 1 according to the present embodiment can generate the correction parameters PmC for correcting the projection image G with high accuracy by appropriately selecting the conversion table TH based on the state of the light source unit 150. The projector 1 can therefore achieve an ideal state of the displayed projection image G or a state close to the ideal state by using the generated correction parameters PmC to correct the projection image G.

In the first embodiment, the low temperature state is an example of a "first state", the high temperature state is an example of a "second state, the low-temperature conversion table 114 is an example of a "first table", and the high-temperature conversion table 115 is an example of a "second table".

The method for controlling the projector 1 according to the first embodiment further includes projecting the pattern image GP from the projector 1, and acquiring the pattern image information 112 based on the result of capture of an image of the pattern image GP, and generating the correction parameters PmC based on the state of the light source unit 150 includes converting the pattern image information 112 into the converted image information JGH based on the state of the light source unit 150, and generating the correction parameters PmC based on the converted image information JGH.

That is, the projector 1 according to the present embodiment can generate the correction parameters PmC based on the result of the capture of an image of the pattern image GP displayed through the projection of the image light reflecting the state of the light source unit 150. The projector 1 can thus accurately correct the projection image G.

In the first embodiment, the pattern image GP is an example of a "pattern image", the pattern image information 112 is an example of "captured image information", and the converted image information JGH is an example of "converted image information".

In the method for controlling the projector 1 according to the first embodiment, the pattern image information 112 contains the RGB information JCR expressed by the RGB color system, the converted image information JGH contains the XYZ information JCX expressed by the XYZ color system, converting the pattern image information 112 into the converted image information JGH based on the state of the light source unit 150 is converting the RGB information JCR into the XYZ information JCX based on the state of the light source unit 150, and generating the correction parameters PmC based on the converted image information JGH is generating the correction parameters PmC based on the XYZ information JCX.

That is, the projector 1 according to the present embodiment can correct the projection image G based on the spectral sensitivity characteristic of the human eye by converting the RGB information JCR contained in the pattern image information 112 into the XYZ information JCX, and setting target values in the image correction by using the XYZ values, which are the tristimulus values based on the XYZ color system, when generating the correction parameters PmC. The projector 1 can thus more accurately correct the projection image G.

In the first embodiment, the RGB color system is an example of a "first color system", the XYZ color system is an example of a "second color system", the RGB information JCR is an example of "captured color information", and the XYZ information JCX is an example of "converted color information".

In the method for controlling the projector 1 according to the first embodiment, when the state of the light source unit 150 is the low temperature state, converting the RGB information JCR into the XYZ information JCX based on the state of the light source unit 150 includes converting the RGB information JCR into the XYZ information JCX based on the low-temperature conversion table 114 corresponding to the low temperature state, and when the state of the light source unit 150 is the high temperature state, converting the RGB information JCR into the XYZ information JCX based on the state of the light source unit 150 includes converting the RGB information JCR into the XYZ information JCX based on the high-temperature conversion table 115 corresponding to the high temperature state.

That is, the projector 1 according to the present embodiment can generate the XYZ information JCX used when generating the correction parameters PmC with high accuracy by appropriately selecting the conversion table TH based on the state of the light source unit 150. The projector 1 can therefore achieve an ideal state of the displayed projection image G or a state close to the ideal state by using the generated correction parameters PmC to correct the projection image G.

The method for controlling the projector 1 according to the first embodiment further includes generating the new conversion table THN based on the state of the light source unit 150, the low-temperature conversion table 114, and the high-temperature conversion table 115 when the state of the light source unit 150 is the other state different from the low temperature state and the high temperature state, and converting the RGB information JCR into the XYZ information JCX based on the state of the light source unit 150 includes converting the RGB information JCR into the XYZ information JCX based on the new conversion table THN.

That is, the projector 1 according to the present embodiment can generate the XYZ information JCX used when generating the correction parameters PmC with high accuracy by appropriately generating the new conversion table THN based on the state of the light source unit 150 and using the new conversion table THN. The projector 1 can therefore achieve an ideal state of the displayed projection image G or a state close to the ideal state by using the generated correction parameters PmC to correct the projection image G.

In the first embodiment, the other state is an example of a "third state", and the new conversion table THN is an example of a "third table".

2. Second Embodiment

A second embodiment of the present disclosure will be described below. In the forms presented below by way of example, an element having the same effect and function as that in the first embodiment has the same reference character used in the description of the first embodiment, and no detailed description of the same element will be made as appropriate.

The configuration and function of a projector 1α according to the second embodiment will be described below with reference to FIGS. 10 to 11. The function of a parameter generation section 125α and a method for generating the correction parameters PmC in the projector 1α according to the second embodiment will be described with reference to FIG. 18.

Figure 10:
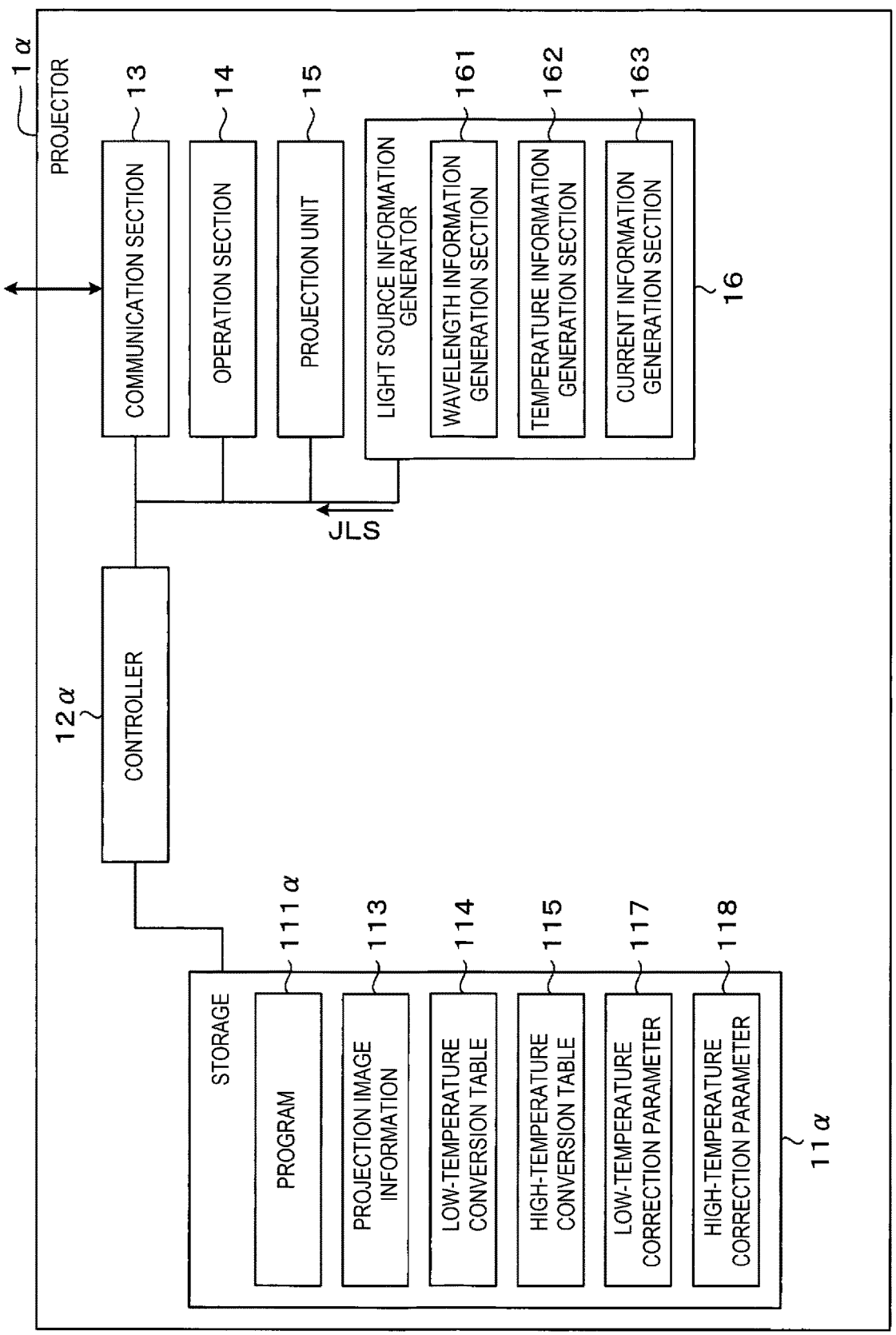
FIG. 10 is a block diagram showing the configuration of a projector according to a second embodiment.

FIG. 10 is a block diagram showing the configuration of the projector 1α according to the second embodiment. The projector 1α has the same configuration as that of the projector 1 according to the first embodiment except that the projector 1α includes a storage 11α in place of the storage 11 and a controller 12α in place of the controller 12 and does not include the imaging section 17. The storage 11α has the same configuration as that of the storage 11 except that the storage 11α stores a program 111α in place of the program 111, stores the low temperature correction parameters 117 and the high temperature correction parameters 118 in addition to the projection image information 113, the low-temperature conversion table 114, and the high-temperature conversion table 115, and does not store the pattern image information 112 or the target XYZ information 116.

Figure 11:
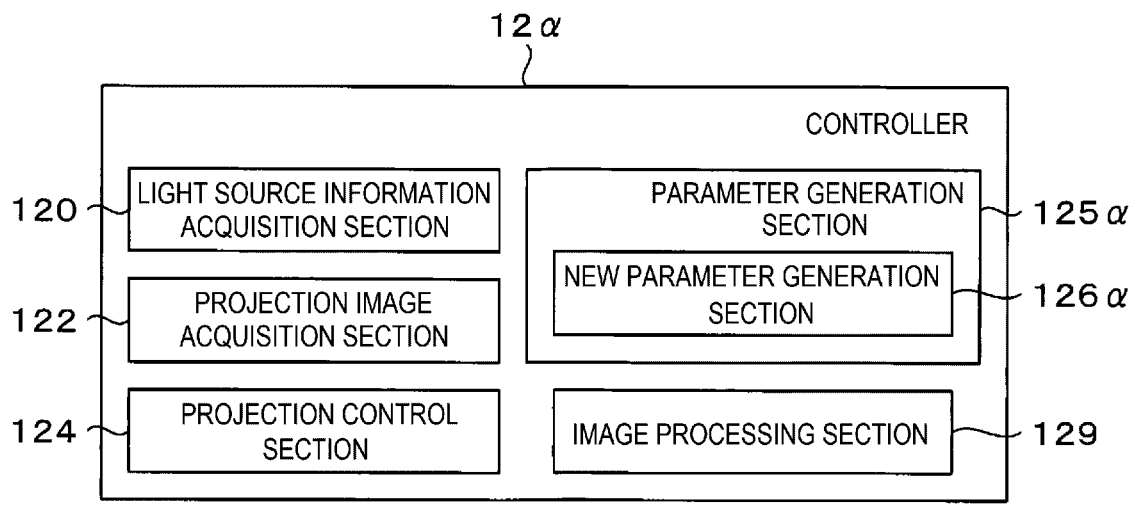
FIG. 11 is a block diagram showing the functional configuration of a controller according to the second embodiment.

FIG. 11 is a block diagram showing the functional configuration of the controller 12α according to the second embodiment. The controller 12α has the same configuration as that of the controller 12 according to the first embodiment except that the controller 12α has the function of the parameter generation section 125α in place of the parameter generation section 125, and the controller 12α does not have the function of the light source state evaluation section 121 or the function of the imaging control section 123. The parameter generation section 125α has the same configuration as that of the parameter generation section 125 according to the first embodiment except that the parameter generation section 125α has the function of a new parameter generation section 126α in place of the new parameter generation section 126, and the parameter generation section 125α does not have the function of the image information conversion section 127 or the function of the table generation section 128. When the CPU or any other device provided in the controller 12α executes the program 111α, the controller 12α operates in accordance with the program 111α to function as the light source information acquisition section 120, the projection image acquisition section 122, the projection control section 124, the parameter generation section 125α, and the image processing unit 129 shown in FIG. 11. The parameter generation section 125α specifically functions as the new parameter generation section 126α.

Figure 18:
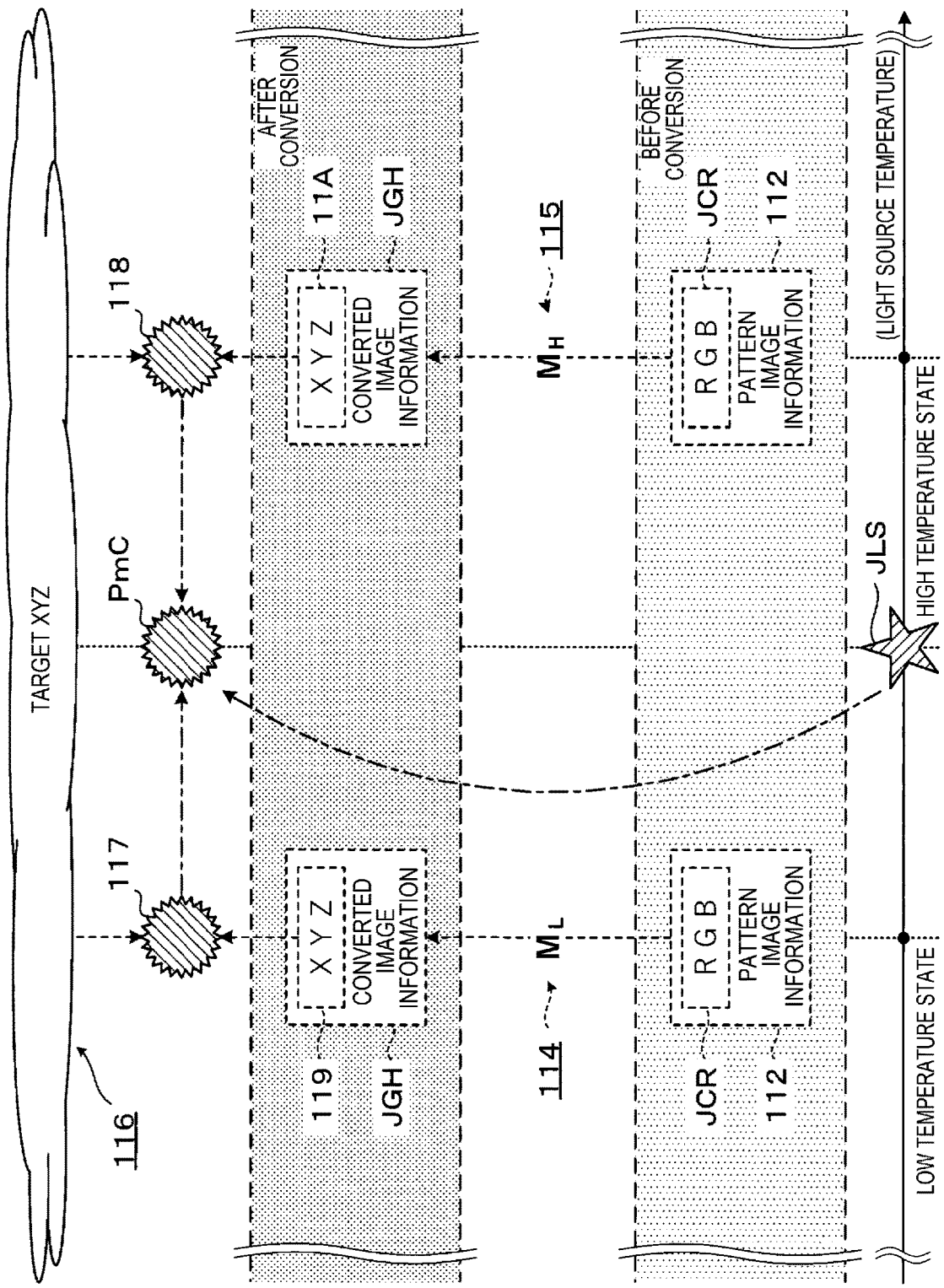
FIG. 18 is a conceptual view for describing the process of generating the correction parameters in the projector according to the second embodiment.

FIG. 18 is a conceptual view for describing the process of generating the correction parameters PmC in the projector 1α according to the second embodiment. In the present embodiment, the projector 1α generates the correction parameters PmC for correcting the projection image G based on the light source information JLS based on the state of the light source unit 150, the low-temperature correction parameters 117, and the high-temperature correction parameters 118.

The low-temperature correction parameters 117 are the correction parameters PmC generated based on the low-temperature XYZ information 119, which is produced based on the low-temperature conversion table 114 by converting the RGB information JCR contained in the pattern image information 112 acquired in the low temperature state, and the target XYZ information 116, as described above. The low-temperature correction parameters 117 are parameters for correcting the state of the displayed projection image G to an ideal state or a state close to the ideal state in the low temperature state.

The high-temperature correction parameters 118 are the correction parameters PmC generated based on the high-temperature XYZ information 11A, which is produced based on the high-temperature conversion table 115 by converting the RGB information JCR contained in the pattern image information 112 acquired in the high temperature state, and the target XYZ information 116, as described above. The high-temperature correction parameters 118 are parameters for correcting the state of the displayed projection image G to an ideal state or a state close to the ideal state in the high temperature state.

The low-temperature correction parameters 117 and the high-temperature correction parameters 118 may be stored in the storage 11α in advance, or may be acquired from the external storage apparatus, the external server, or any other apparatus via the communication section 13. The low-temperature correction parameters 117 and the high-temperature correction parameters 118 may instead be generated in advance, for example, by communicatively connecting the projector 1α to a camera having a configuration comparable to that of the imaging section 17 and a personal computer having functions comparable to those of the storage 11 and controller 12, and acquiring the pattern image information 112 in the low temperature state and the pattern image information 112 in the high temperature state before the projector 1α is shipped.

The new parameter generation section 126α generates the correction parameters PmC based on the light source information JLS, the low-temperature correction parameters 117, and the high-temperature correction parameters 118, as shown in FIG. 18. In other words, the new parameter generation section 126α generates the correction parameters PmC based on the state of the light source unit 150, the low-temperature correction parameters 117 based on the low-temperature conversion table 114, and the high-temperature correction parameters 118 based on the high-temperature conversion table 115.

For example, it is assumed that the correction parameters PmC contain information on the colors expressed by the RGB color system, and that the information represents vectors in the RGB color space. Now let $V_L$ be a vector representing the low-temperature correction parameters 117, $V_H$ be a vector representing the high-temperature correction parameters 118, and $V_N$ be a vector representing the correction parameters PmC newly generated based on the light source information JLS, the low-temperature correction parameters 117, and the high-temperature correction parameters 118, and the new parameter generation section 126α may generate the correction parameters PmC based on an expression $V_N = c \times V_L + (1-c) \times V_H$. In the expression, the value c may be a real number that satisfies the relational expression $c = (T_H - T_N)/(T_H - T_L)$, as in the first embodiment. That is, when the state of the light source unit 150 is the low temperature state, substituting the values into the first expression in this paragraph yields $V_N = V_L$, so that the new parameter generation section 126α generates the low-temperature correction parameters 117 as the correction parameters PmC. When the state of the light source unit 150 is the high temperature state, substituting the values into the first expression in this paragraph yields $V_N = V_H$, so that the new parameter generation section 126α generates the high-temperature correction parameters 118 as the correction parameters PmC.

Figure 12:
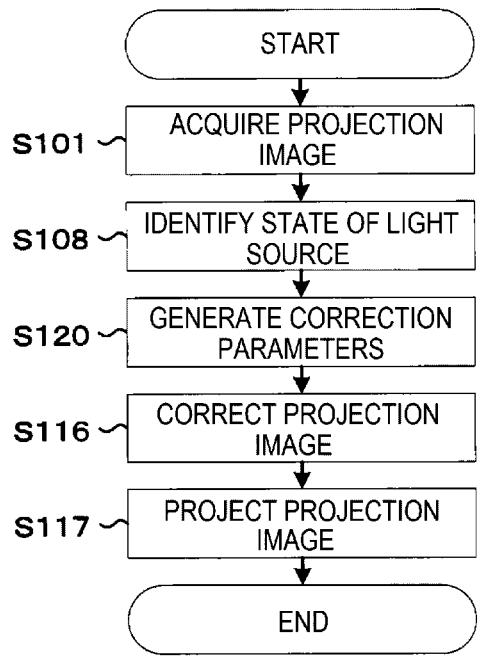
FIG. 12 is a flowchart for describing the action of the projector according to the second embodiment.

FIG. 12 is a flowchart for describing the action of the projector 1α according to the second embodiment. The flowchart shown in FIG. 12 is the same as the flowchart shown in FIG. 9 except that the control section 12α does not carry out the processes in steps S102 to S107 but carries out the process in step S120 in place of the processes in steps S109 to S115.

In step S120, the new parameter generation section 126α generates the correction parameters PmC based on the light source information JLS, the low-temperature correction parameters 117, and the high-temperature correction parameters 118.

As described above, according to the second embodiment, the state of the light source unit 150 can be identified, and the correction parameters PmC can be generated with high accuracy based on the state of the light source unit 150. The projector 1α can therefore use the correction parameters PmC to achieve an ideal state of the displayed projection image G or a state close to the ideal state.

According to the second embodiment, the correction parameters PmC can be generated even when the projector 1α does not include the imaging section 17. The configuration of the projector 1α can therefore be more simplified.

As described above, in the method for controlling the projector 1α according to the second embodiment, generating the correction parameters PmC based on the state of the light source unit 150 includes generating the correction parameters PmC based on the state of the light source unit 150, the low-temperature correction parameters 117 based on the low-temperature conversion table 114, and the high-temperature correction parameters 118 based on the high-temperature table conversion 115, the low-temperature conversion table 114 corresponds to the case where the state of the light source unit 150 is the low temperature state, and the high-temperature conversion table 115 corresponds to the case where the state of the light source unit 150 is the high temperature state.

That is, the projector 1α according to the present embodiment can generate, based on the state of the light source unit 150, the correction parameters PmC for correcting the projection image G with high accuracy. The projector 1α can therefore correct the projection image G by using the generated correction parameters PmC to achieve an ideal state of the displayed projection image G or a state close to the ideal state.

In the second embodiment, the light source unit 150 is an example of the "light source", the correction parameters PmC are an example of the "correction parameter", the low-temperature conversion table 114 is an example of the "first table", the high-temperature conversion table 115 is an example of the "second table", the low-temperature correction parameters 117 are an example of a "first correction parameter", the high-temperature correction parameters 118 are an example of a "second correction parameter", the low-temperature state is an example of the "first state", and the high temperature state is an example of the "second state".

3. Variations

The embodiments described above can be changed in a variety of manners. Specific aspects of the changes will be presented below by way of example. Two or more aspects arbitrarily selected from those presented below may be combined with each other as appropriate to the extent that the selected aspects do not contradict each other. In the variations presented below by way of example, an element providing the same effect and having the same function as those in the embodiments described above has the same reference character used in the above description, and no detailed description of the same element will be made as appropriate.

3.1. Variation 1

The aforementioned first embodiment has been described with reference to the case where the controller 12 has the function of the light source state evaluation section 121, but not necessarily in the present disclosure. That is, the projector 1 may not evaluate the state of the light source unit 150 based on the light source information JLS. Specifically, in the flowchart shown in FIG. 9, the controller 12 may carry out none of the processes in steps S109, S110, S112, and S113 but carry out the process in step S108 and then proceed to the process in step S111.

For example, it is assumed as described above that the table generation section 128 generates the new conversion table THN based on the expression $M_N = c \times M_L + (1-c) \times M_H$, where $M_N$ represents a matrix representing the new conversion table THN, $M_L$ represents a matrix representing the low-temperature conversion table 114, and $M_H$ represents a matrix representing the high-temperature conversion table 115. It is further assumed that the value c is a real number that satisfies the relationship $c=(T_H-T_N)/(T_H-T_L)$, where $T_N$ represents the temperature of the light source unit 150 at the time of generation of the new conversion table THN, $T_L$ represents the temperature of the light source unit 150 in the low temperature state, and $T_H$ represents the temperature of the light source unit 150 in the high temperature state. The relationship between the temperatures $T_L$ and $T_H$ is $T_L<T_H$. When the state of the light source unit 150 is the low temperature state, substituting the values into the first expression in this paragraph yields $M_N=M_L$, so that the table generation section 128 generates the low-temperature conversion table 114 as the new conversion table THN in step S108. That is, when the state of the light source unit 150 is the low temperature state, the image information conversion section 127 converts the RGB information JCR into the XYZ information JCX based on the low-temperature conversion table 114 corresponding to the low temperature state in step S114. When the state of the light source unit 150 is the high temperature state, substituting the values into the first expression in this paragraph yields $M_N=M_H$, so that the table generation section 128 generates the high-temperature conversion table 115 as the new conversion table THN in step S108. That is, when the state of the light source unit 150 is the high temperature state, the image information conversion section 127 converts the RGB information JCR into the XYZ information JCX based on the high-temperature conversion table 115 corresponding to the high temperature state in step S114.

As described above, according to Variation 1, the conversion table TH can be appropriately generated based on the state of the light source unit 150 even when the state of the light source unit 150 is not evaluated.

3.2. Variation 2

The aforementioned embodiments and variation have been described with reference to the case where the table generation section 128 generates the new conversion table THN, and the image information conversion section 127 converts the RGB information JCR into the XYZ information JCX based on the new conversion table THN, but not necessarily in the present disclosure. For example, the XYZ information JCX may be generated based on the state of the light source unit 150, the low-temperature XYZ information 119, and the high-temperature XYZ information 11A.

The configuration and function of a projector 1β according to Variation 2 will be described below with reference to FIGS. 13 and 14. The function of a parameter generation section 125β and a method for generating the correction parameters PmC in the projector 1β according to Variation 2 will be described with reference to FIG. 19.

Figure 13:
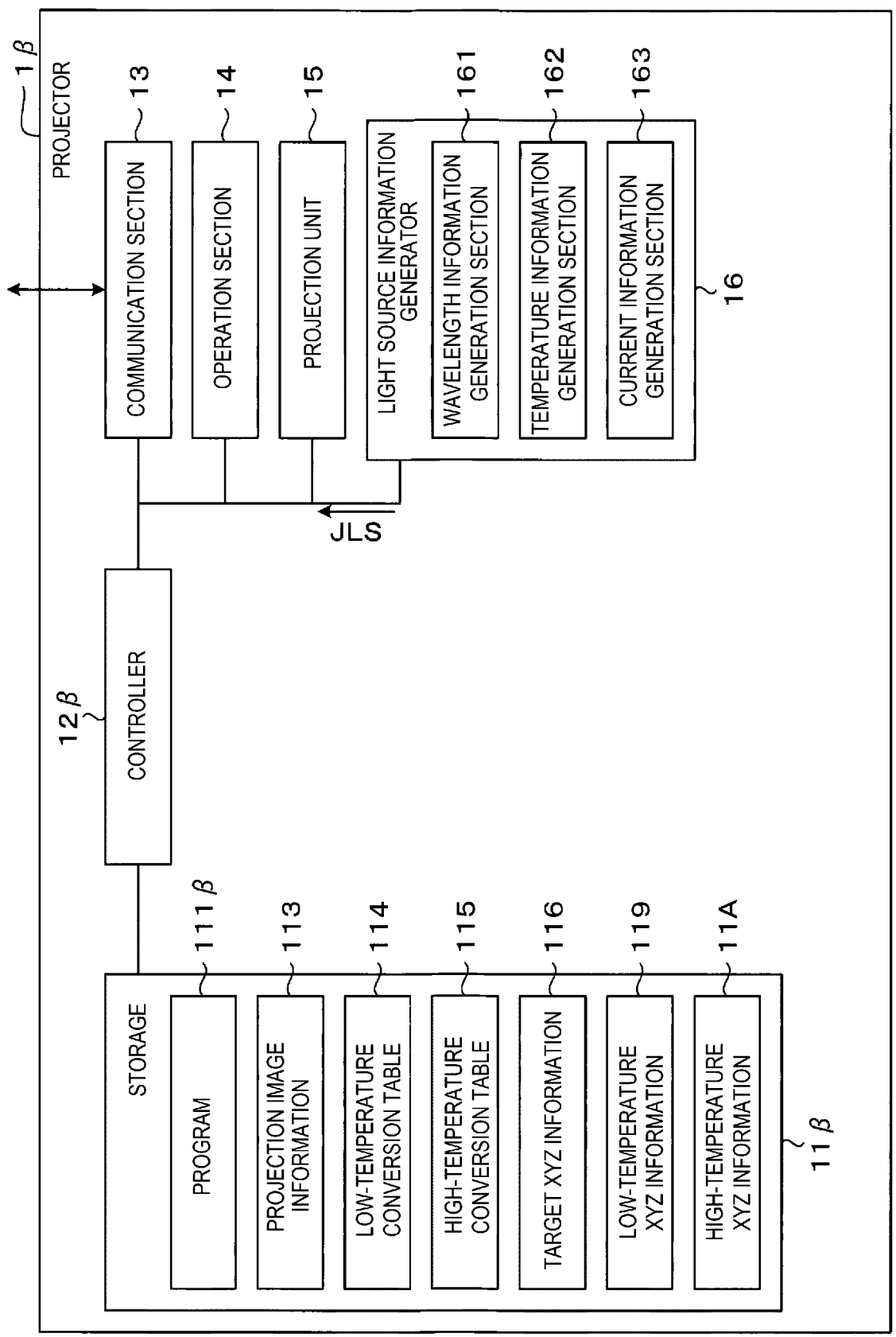
FIG. 13 is a block diagram showing the configuration of a projector according to Variation 2.

FIG. 13 is a block diagram showing the configuration of the projector 1β according to Variation 2. The projector 1β has the same configuration as that of the projector 1 according to the first embodiment except that the projector 1β includes a storage 11β in place of the storage 11 and a controller 12β in place of the controller 12 and does not include the imaging section 17. The storage 11β has the same configuration as that of the storage 11 except that the storage 11β stores a program 111β in place of the program 111, stores the low-temperature XYZ information 119 and the high-temperature XYZ information 11A in addition to the projection image information 113, the low-temperature conversion table 114, the high-temperature conversion table 115, the target XYZ information 116, and other pieces of information, and does not store the pattern image information 112.

Figure 14:
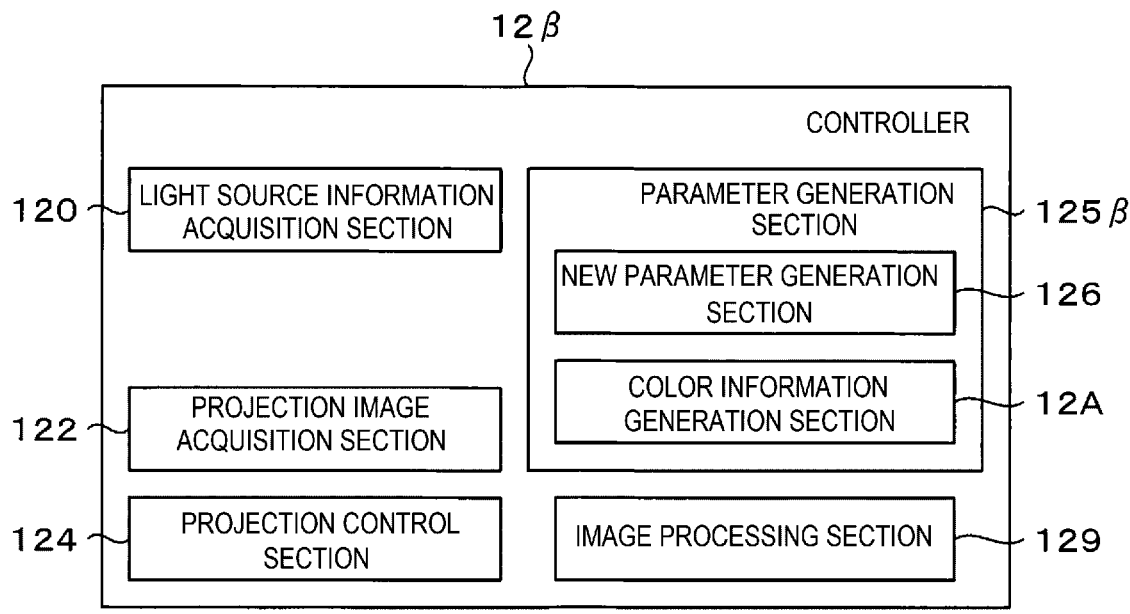
FIG. 14 is a block diagram showing the functional configuration of a controller according to Variation 2.

FIG. 14 is a block diagram showing the functional configuration of the controller 12β according to Variation 2. The controller 12β has the same configuration as that of the controller 12 according to the first embodiment except that the controller 12β has the function of the parameter generation section 125β in place of the parameter generation section 125, and that the controller 12β does not have the function of the light source state evaluation section 121 or the function of the imaging control section 123. The parameter generation section 125β has the same configuration as that of the parameter generation section 125 according to the first embodiment except that the parameter generation section 125β has the function of a color information generation section 12A in place of the image information conversion section 127 and table generation section 128. When the CPU or any other device provided in the controller 12β executes the program 111β, the controller 12β operates in accordance with the program 111β to function as the light source information acquisition section 120, the projection image acquisition section 122, the projection control section 124, the parameter generation section 125β, and the image processing unit 129 shown in FIG. 14. The parameter generation section 125β specifically functions as the new parameter generation section 126 and the color information generation section 12A.

Figure 19:
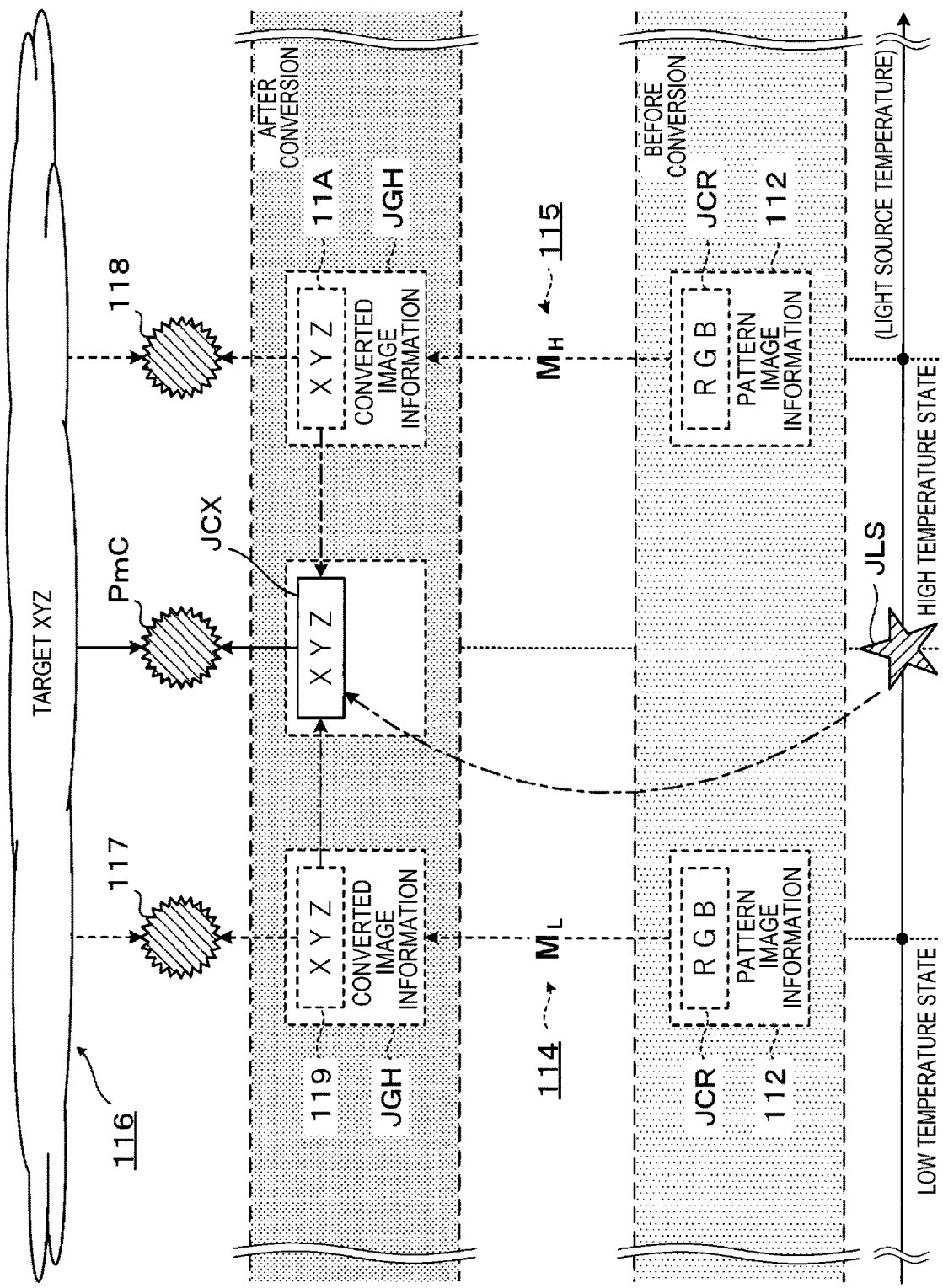
FIG. 19 is a conceptual view for describing the process of generating the correction parameters in the projector according to Variation 2.

FIG. 19 is a conceptual view for describing the process of generating the correction parameters PmC in the projector 1β according to Variation 2. In the present variation, the projector 1β generates the XYZ information JCX based on the light source information JLS based on the state of light source unit 150, the low-temperature XYZ information 119, and the high-temperature XYZ information 11A. The projector 1β then generates the correction parameters PmC for correcting the projection image G based on the XYZ information JCX and the target XYZ information 116.

The low-temperature XYZ information 119 is the XYZ information JCX produced by converting, based on the low-temperature conversion table 114, the RGB information JCR contained in the pattern image information 112 acquired in the low temperature state, as described above.

The high-temperature XYZ information 11A is the XYZ information JCX produced by converting, based on the high-temperature conversion table 115, the RGB information JCR contained in the pattern image information 112 acquired in the high temperature state, as described above.

The low-temperature XYZ information 119 and the high-temperature XYZ information 11A may be stored in the storage 11β in advance, or may be acquired from the external storage apparatus, the external server, or any other apparatus via the communication section 13. The low-temperature XYZ information 119 and the high-temperature XYZ information 11A may instead be generated in advance, for example, by communicatively connecting the projector 1β to a camera having a configuration comparable to that of the imaging section 17 and a personal computer having functions comparable to those of the storage 11 and controller 12, and acquiring the pattern image information 112 in the low temperature state and the pattern image information 112 in the high temperature state before the projector 1β is shipped.

The color information generator 12A generates the XYZ information JCX based on the light source information JLS, the low-temperature XYZ information 119, and the high-temperature XYZ information 11A, as shown in FIG. 19.

For example, the XYZ information JCX is assumed to be information on vectors in an XYZ color space. Now let $W_L$ be the vector representing the low-temperature XYZ information 119, $W_H$ be the vector representing the high-temperature XYZ information 11A, and $W_N$ be the vector representing the XYZ information JCX newly generated based on the light source information JLS, the low-temperature XYZ information 119, and the high-temperature XYZ information 11A, the color information generation section 12A may generate the XYZ information JCX based on an expression $W_N = c \times W_L + (1-c) \times W_H$. In the expression, the value c may be a real number that satisfies the relational expression $c = (T_H - T_N)/(T_H - T_L)$, as in the first embodiment. That is, when the state of the light source unit 150 is the low temperature state, substituting the values into the first expression in this paragraph yields $W_N = W_L$, so that the color information generation section 12A generates the low-temperature XYZ information 119 as the XYZ information JCX. When the state of the light source unit 150 is the high temperature state, substituting the values into the first expression in this paragraph yields $W_N = W_H$, so that the color information generation section 12A generates the high-temperature XYZ information 11A as the XYZ information JCX.

Figure 15:
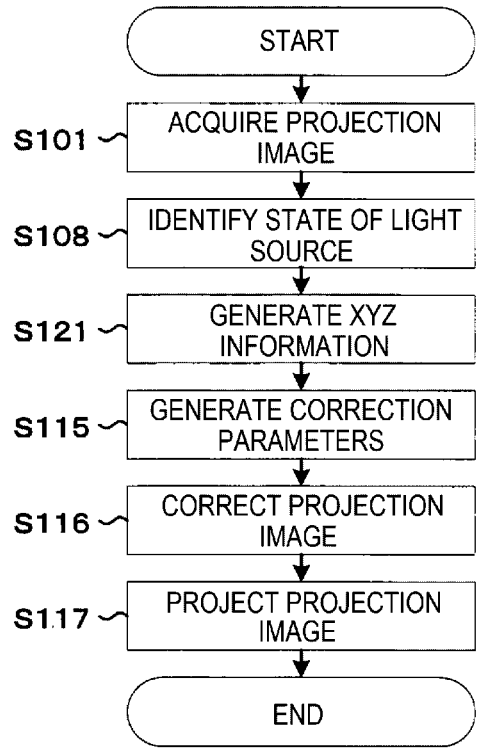
FIG. 15 is a flowchart for describing the action of the projector according to Variation 2.

FIG. 15 is a flowchart for describing the action of the projector 1β according to Variation 2. The flowchart shown in FIG. 15 is the same as the flowchart shown in FIG. 9 except that the controller 12β does not carry out the processes in steps S102 to S107 but carries out the process in step S121 in place of the processes in steps S109 to S114.

In step S121, the color information generation section 12A generates the XYZ information JCX based on the light source information JLS, the low-temperature XYZ information 119, and the high-temperature XYZ information 11A.

In step S115, the new parameter generation section 126 generates the correction parameters PmC based on the degree of the difference between the XYZ information JCX generated in step S121 and the target XYZ information 116.

When the states of the light sources are each the low temperature state, the projector 1β generates the low-temperature XYZ information 119 as the XYZ information JCX in step S121, as described above. Thereafter, in step S115, the projector 1β generates the correction parameters PmC based on the degree of the difference between the low-temperature XYZ information 119 and the target XYZ information 116. That is, when the states of the light source are each the low temperature state, the projector 1β generates the correction parameters PmC based on the low-temperature XYZ information 119 based on the low-temperature conversion table 114.

When the states of the light sources are each the high temperature state, the projector 1β generates the high-temperature XYZ information 11A as the XYZ information JCX in step S121, as described above. Thereafter, in step S115, the projector 1β generates the correction parameters PmC based on the degree of the difference between high-temperature XYZ information 11A and the target XYZ information 116. That is, when the states of the light sources are each the high temperature state, the projector 1β generates the correction parameters PmC based on the high-temperature XYZ information 11A based on the high-temperature conversion table 115.

When the states of the light sources are each the other state, the projector 1β generates the XYZ information JCX based on the light source information JLS based on the state of light source unit 150, the low-temperature XYZ information 119, and the high-temperature XYZ information 11A in step S121. Thereafter, in step S115, the projector 1β generates the correction parameters PmC based on the degree of the difference between the XYZ information JCX based on the state of the light source unit 150 and the target XYZ information 116.

As described above, according to Variation 2, the correction parameters PmC for correcting the projection image G can be generated with high accuracy by identifying the state of the light source unit 150 and using the XYZ information JCX based on the conversion table TH corresponding to the state of the light source unit 150. The projector 1β can therefore use the correction parameters PmC to achieve an ideal state of the displayed projection image G or a state close to the ideal state.

According to Variation 2, the state of the light source unit 150 can be identified, and the XYZ information JCX can be generated with high accuracy based on the state of the light source unit 150. The projector 1β can thus accurately generate the correction parameters PmC for correcting the projection image G.

As described above, in the method for controlling the projector 1β according to Variation 2, generating the correction parameters PmC based on the low-temperature conversion table 114 corresponding to the low temperature state includes generating the correction parameters PmC based on the low-temperature XYZ information 119 based on the low-temperature conversion table 114, and generating the correction parameters PmC based on the high-temperature conversion table 115 corresponding to the high temperature state includes generating the correction parameters PmC based on the high-temperature XYZ information 11A based on the high-temperature conversion table 115.

That is, the projector 1β according to Variation 2 can generate the correction parameters PmC for correcting the projection image G with high accuracy by appropriately selecting the XYZ information JCX based on the state of the light source unit 150. The projector 1β can thus correct the projection image G by using the generated correction parameters PmC to achieve an ideal state of the displayed projection image G or a state close to the ideal state.

In Variation 2, the low temperature state is an example of the "first state", the high temperature state is an example of the "second state", the low-temperature conversion table 114 is an example of the "first table", the high-temperature conversion table 115 is an example of the "second table", the correction parameters PmC are an example of the "correction parameter", the low-temperature XYZ information 119 is an example of "first converted color information", and the high-temperature XYZ information 11A is an example of "second converted color information".

The method for controlling the projector 1β according to Variation 2 further includes, when the state of the light source unit 150 is the other state different from the low temperature state and the high temperature state, generating the XYZ information JCX based on the state of the light source unit 150, the low-temperature XYZ information 119, and the high temperature XYZ information 11A, and generating the correction parameters PmC based on the state of the light source unit 150 includes generating the correction parameters PmC based on the XYZ information JCX.

That is, the projector 1β according to Variation 2 can generate the correction parameters PmC for correcting the projection image G with high accuracy by appropriately generating the XYZ information JCX based on the state of the light source unit 150. The projector 1β can thus correct the projection image G by using the generated correction parameters PmC to achieve an ideal state of the displayed projection image G or a state close to the ideal state.

In Variation 2, the light source unit 150 is an example of the "light source", the other state is an example of the "third state", and the XYZ information JCX is an example of the "converted color information".

3.3. Variation 3

The aforementioned embodiments and variations have been described with reference to the case where the projector identifies the state of the light source unit 150, generates the correction parameters PmC based on the state of the light source unit 150, and corrects the projection image G based on the correction parameters PmC, but not necessarily in the present disclosure. For example, a personal computer communicatively connected to the projector may identify the state of the light source unit 150, generate the correction parameters PmC based on the state of the light source unit 150, and correct the projection image G based on the correction parameters PmC.

Figure 16:
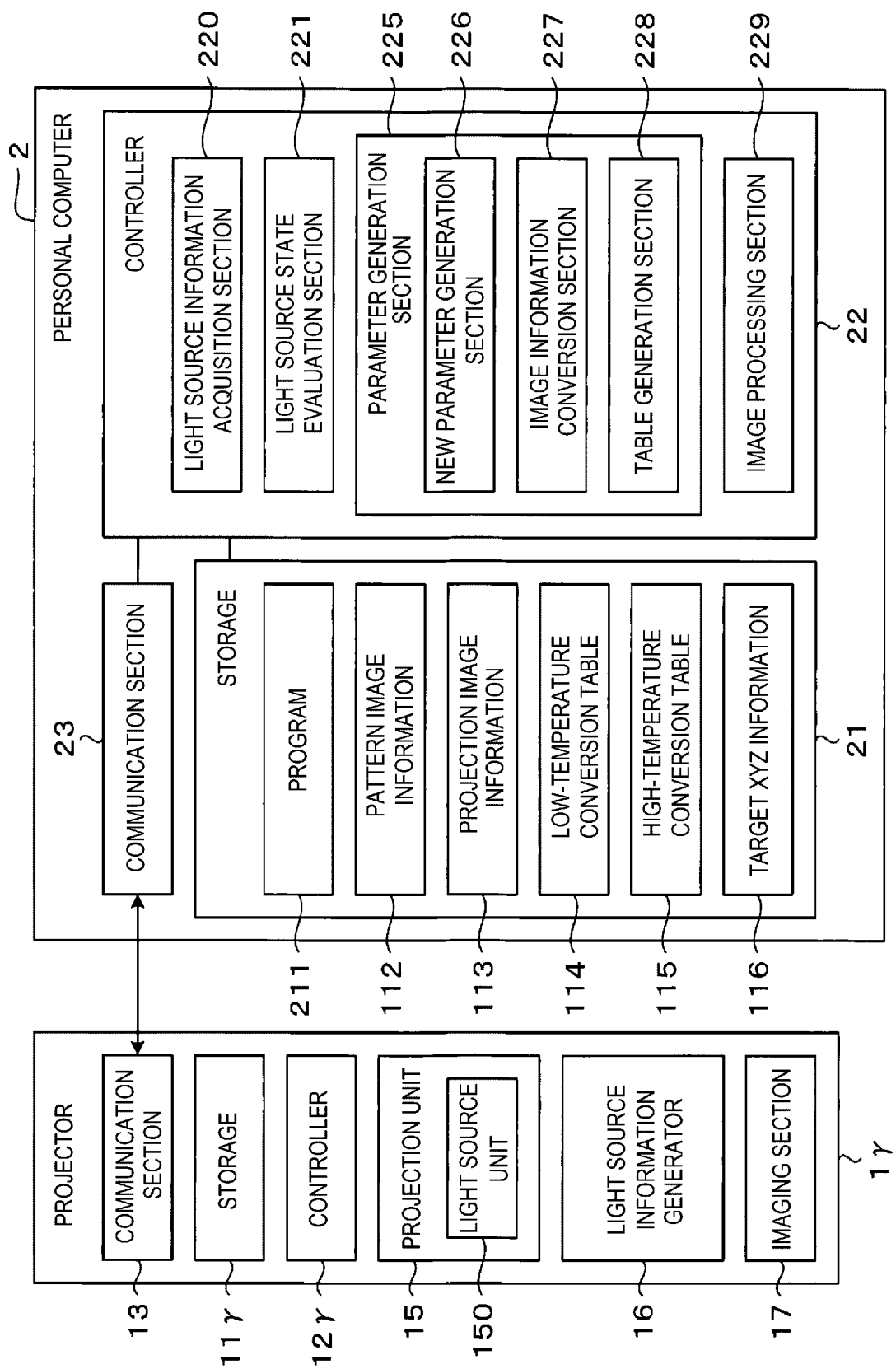
FIG. 16 is a block diagram showing the configurations of a projector and a personal computer according to Variation 3.

FIG. 16 is a block diagram showing the configurations of a projector 1γ and a personal computer 2 according to Variation 3.

The projector 1γ has the same configuration as that of the projector 1 according to the first embodiment except that the projector 1γ includes a storage 11γ in place of the storage 11 and a controller 12γ in place of the controller 12 and does not include the operation section 14. The storage 11γ differs from the storage 11 in that the storage 11γ stores a program lily that is not shown in place of the program 111. The controller 12γ differs from the controller 12 in that the CPU or any other device provided in the controller 12γ executes the program lily and operates in accordance with the program 111γ. The controller 12γ specifically differs from the controller 12 in that the controller 12γ does not have at least part of the series of functions relating to the correction of the projection image G. In the present variation, the controller 12γ is assumed to function as the projection image acquisition section 122, the imaging control section 123, and the projection control section 124.

The personal computer 2 includes a storage 21, which stores a variety of pieces of information, a controller 22, which controls the action of personal computer 2, and a communication section 23, which performs communication with the projector 1γ, the external server, or any other apparatus. The storage 21 has the same configuration as that of the storage 11 except that the storage 21 stores a program 211 in place of the program 111. The controller 22 includes one or more CPUs. It is, however, noted that the controller 22 may include a programmable logic device, such as an FPGA, in place of or in addition to the CPU or CPUs. When the CPU or any other device provided in the controller 22 executes the program 211, the controller 22 operates in accordance with the program 211 to function as a light source information acquisition section 220, a light source state evaluation section 221, a parameter generation section 225, and an image processing unit 229 shown in FIG. 16, and a pattern image acquisition section 22A, which is not shown. The parameter generation section 225 specifically functions as a new parameter generation section 226, an image information conversion section 227, and a table generation section 228. The light source information acquisition section 220 has the same function as that of the light source information acquisition section 120. The light source state evaluation section 221 has the same function as that of the light source state evaluation section 121. The new parameter generation section 226 has the same function as that of the new parameter generation section 126. The image information conversion section 227 has the same function as that of the image information conversion section 127. The table generation section 228 has the same function as that of the table generation section 128. The pattern image acquisition section 22A acquires the pattern image information 112 from the projector 1γ. The communication section 23 includes, for example, an interface substrate including a connector and an interface circuit, and has the function of receiving a variety of pieces of information from the projector 1γ, the external server, or any other apparatus and the function of transmitting a variety of pieces of information to the projector 1γ, the external server, or any other apparatus.

As described above, according to Variation 3, the personal computer 2 communicatively connected to the projector 1γ can, in place of the projector 1γ, identify the state of the light source unit 150, generate the correction parameters PmC based on the status of the light source unit 150, and correct the projection image G based on the correction parameters PmC. Therefore, for example, using the personal computer 2, which has excellent processing functions, can shorten the period required to correct the projection image G.

As described above, the personal computer 2 according to Variation 3 is the personal computer 2 that corrects the projection image G projected from the projector 1γ including the light source unit 150, and includes the light source information acquisition section 220, which identifies the state of the light source unit 150, the parameter generation section 225, which generates the correction parameters PmC based on the state of the light source unit 150, and the image processing section 229, which corrects the projection image G based on the correction parameters PmC.

That is, the personal computer 2 according to Variation 3 can correct the projection image G by identifying the state of the light source unit 150 and using the correction parameters PmC generated based on the state of the light source unit 150 even when the state of the displayed projection image G changes due to a change in the state of the light source unit 150. The personal computer 2 can thus achieve an ideal state of the displayed projection image G, which is projected from the projector 1γ, or a state close to the ideal state.

In Variation 3, the projector 1γ is an example of the "projector", the light source unit 150 is an example of the "light source", the correction parameters PmC are an example of the "correction parameter", the projection image G is an example of the "image", the personal computer 2 is an example of an "information processing apparatus", the light source information acquisition section 220 is an example of the "light source state identification section", the parameter generation section 225 is an example of the "parameter generation section", and the image processing section 229 is an example of an "image processing section".

3.4. Variation 4

The aforementioned embodiments and variations have been described with reference to the case where the projector converts the RGB information JCR contained in the pattern image information 112 into the XYZ information JCX by using the new conversion table THN generated based on the light source information JLS, the low-temperature conversion table 114, and the high-temperature conversion table 115, but not necessarily in the present disclosure. For example, the conversion table TH based on the light source information JLS may be acquired from the external server or any other apparatus communicatively connected to the projector, and the RGB information JCR contained in the pattern image information 112 may be converted into the XYZ information JCX by using the conversion table TH. The projector according to the present variation includes a table acquisition section. The table acquisition section acquires the conversion table TH based on the light source information JLS from the external server or any other source.

3.5. Variation 5

The aforementioned embodiments and variations have been described with reference to the case where the converted image information JGH is generated by identifying the state of the light source unit 150 and converting the pattern image information 112 based on the conversion table TH corresponding to the state of the light source unit 150. For example, the converted image information JGH may be generated by separately identifying the state of the red light source 151, the state of the green light source 152, and the state of the blue light source 153, converting the imaging information JPR contained in the pattern image information 112 based on the conversion table TH corresponding to the state of the red light source 151, converting the imaging information JPG contained in the pattern image information 112 based on the conversion table TH corresponding to the state of the green light source 152, and converting the imaging information JPB contained in the pattern image information 112 based on the conversion table TH corresponding to the state of the blue light source 153.

That is, the pattern image information 112 can be converted with high accuracy by identifying the state of each of the three light sources provided in the light source unit 150 and using three conversion tables corresponding to the states of the light sources. The projector according to Variation 5 can thus generate the correction parameters PmC containing only a small amount of incorrectness.

3.6. Variation 6

The aforementioned embodiments and variations have been described with reference to the case where the light source unit 150 includes three light sources, the red light source 151, the green light source 152, and the blue light source 153, and the three light sources each emit light, but not necessarily in the present disclosure. For example, the red light source 151 and the green light source 152 may be replaced with a light source that emits light comparable to the light emitted from the blue light source 153, and blue laser light emitted from the light source may be converted into light having the other colors. Specifically, a phosphor that converts the blue laser light into yellow light, which is the complementary color of blue light, may be provided, and the yellow light emitted when the phosphor is irradiated with the blue laser light may be separated into red light and green light. In this case, the light source information generator 16 preferably includes the wavelength information generation section 161.

3.7. Variation 7

The aforementioned embodiments and variations have been described with reference to the case where the low temperature state is a state in which the temperature of the light source unit 150 is 0° C., and the low temperature state may instead be a state in which the temperature of the light source unit 150 is not 0° C. The aforementioned embodiments and variations have been described with reference to the case where the high temperature state is a state in which the temperature of the light source unit 150 is 50° C., and the high temperature state may instead be a state in which the temperature of the light source unit 150 is not 50° C. For example, the low temperature state may be a state in which the temperature of the light source unit 150 is 10° C. The high temperature state may be a state in which the temperature of the light source unit 150 is 40° C. The low and high temperature states are preferably set within a temperature range over which the red light source 151, the green light source 152, and the blue light source 153 provided in the light source unit 150 properly operate, specifically, within a range from −10° C. to 60° C.

What is claimed is:

1. A method for controlling a projector, the method comprising:
   identifying a state of a light source provided in the projector;
   generating a correction parameter based on the state of the light source;
   correcting an image projected from the projector based on the correction parameter;
   projecting a pattern image from the projector; and
   acquiring captured image information based on a result of capture of an image of the pattern image,
   wherein the generating the correction parameter based on the state of the light source includes:
      converting the captured image information into converted image information based on the state of the light source, and
      generating the correction parameter based on the converted image information,
   the captured image information contains captured color information expressed by a first color system,
   the converted image information contains converted color information expressed by a second color system,
   the converting the captured image information into the converted image information based on the state of the light source includes converting the captured color information into the converted color information based on the state of the light source, and
   the generating the correction parameter based on the converted image information includes generating the correction parameter based on the converted color information.

2. The method for controlling a projector according to claim 1,
   wherein the identifying the state of the light source includes identifying a wavelength of light emitted by the light source.

3. The method for controlling a projector according to claim 1,
   wherein the identifying the state of the light source includes identifying a temperature of the light source.

4. The method for controlling a projector according to claim 1,
   wherein the identifying the state of the light source includes identifying a value of current supplied to the light source.

5. The method for controlling a projector according to claim 1,
   wherein when the state of the light source is a first state, the generating the correction parameter based on the state of the light source includes generating the correction parameter based on a first table corresponding to the first state, and when the state of the light source is a second state, the generating the correction parameter based on the state of the light source includes generating the correction parameter based on a second table corresponding to the second state.

6. The method for controlling a projector according to claim 5, wherein the generating the correction parameter based on the first table corresponding to the first state includes generating the correction parameter based on first converted color information based on the first table, and the generating the correction parameter based on the second table corresponding to the second state includes generating the correction parameter based on second converted color information based on the second table.

7. The method for controlling a projector according to claim 6, further comprising generating converted color information based on the state of the light source, the first converted color information and the second converted color information when the state of the light source is a third state different from the first state and the second state, and wherein the generating the correction parameter based on the state of the light source includes generating the correction parameter based on the converted color information.

8. The method for controlling a projector according to claim 1, wherein the generating the correction parameter based on the state of the light source includes generating the correction parameter based on the state of the light source, a first correction parameter based on a first table, and a second correction parameter based on a second table, the first table corresponds to a case where the state of the light source is a first state, and the second table corresponds to a case where the state of the light source is a second state.

9. The method for controlling a projector according to claim 1, wherein the second color system is an XYZ color system.

10. The method for controlling a projector according to claim 1, when the state of the light source is a first state, the converting the captured color information into the converted color information based on the state of the light source includes converting the captured color information into the converted color information based on a first table corresponding to the first state, and when the state of the light source is the second state, the converting the captured color information into the converted color information based on the state of the light source includes converting the captured color information into the converted color information based on a second table corresponding to the second state.

11. The method for controlling a projector according to claim 10, further comprising generating a third table based on the state of the light source, the first table and the second table when the state of the light source is a third state different from the first state and the second state, and wherein the converting the captured color information into the converted color information based on the state of the light source includes converting the captured color information into the converted color information based on the third table.

12. A projector comprising:

a light source;

one or more processors programmed to:
    generate a correction parameter based on a state of the light source,
    correct a projection image based on the correction parameter,
    project a pattern image from the projector, and
    acquire captured image information based on a result of capture of an image of the pattern image; and a lens group that projects an image corrected based on the correction parameter, wherein, when generating the correction parameter based on the state of the light source, the one or more processors:
    convert the captured image information into converted image information based on the state of the light source, and
    generate the correction parameter based on the converted image information, the captured image information contains captured color information expressed by a first color system, the converted image information contains converted color information expressed by a second color system, the converting the captured image information into the converted image information based on the state of the light source includes converting the captured color information into the converted color information based on the state of the light source, and the generating the correction parameter based on the converted image information includes generating the correction parameter based on the converted color information.

13. An information processing apparatus comprising one or more processors programmed to:
    identify a state of a light source provided in a projector,
    generate a correction parameter based on the state of the light source,
    correct an image projected from the projector based on the correction parameter,
    project a pattern image from the projector, and
    acquire captured image information based on a result of capture of an image of the pattern image, wherein, when generating the correction parameter based on the state of the light source, the one or more processors:
    convert the captured image information into converted image information based on the state of the light source, and
    generate the correction parameter based on the converted image information, the captured image information contains captured color information expressed by a first color system, the converted image information contains converted color information expressed by a second color system, the converting the captured image information into the converted image information based on the state of the light source includes converting the captured color information into the converted color information based on the state of the light source, and the generating the correction parameter based on the converted image information includes generating the correction parameter based on the converted color information.

14. A method for controlling a projector, the method comprising:
- identifying a state of a light source provided in the projector;
- generating a correction parameter based on the state of the light source; and
- correcting an image projected from the projector based on the correction parameter,
- wherein when the state of the light source is a first state, the generating the correction parameter based on the state of the light source includes generating the correction parameter based on a first table corresponding to the first state, and
- when the state of the light source is a second state, the generating the correction parameter based on the state of the light source includes generating the correction parameter based on a second table corresponding to the second state; and
- wherein the generating the correction parameter based on the first table corresponding to the first state includes generating the correction parameter based on first converted color information based on the first table, and
- the generating the correction parameter based on the second table corresponding to the second state includes generating the correction parameter based on second converted color information based on the second table.

* * * * *